(12) United States Patent
Todorovic et al.

(10) Patent No.: US 10,995,698 B2
(45) Date of Patent: May 4, 2021

(54) MIXER ASSEMBLY GROUP FOR A TURBOFAN ENGINE

(71) Applicant: Rolls-Royce Deutschland Ltd & Co KG, Blankenfelde-Mahlow (DE)

(72) Inventors: Predrag Todorovic, Berlin (DE); Thomas Kubisch, Koenigs-Wusterhausen (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 131 days.

(21) Appl. No.: 15/696,619

(22) Filed: Sep. 6, 2017

(65) Prior Publication Data

US 2018/0066605 A1   Mar. 8, 2018

(30) Foreign Application Priority Data

Sep. 7, 2016   (DE) ...................... 10 2016 217 033.3

(51) Int. Cl.
*F02K 1/00* (2006.01)
*F02K 1/38* (2006.01)
(Continued)

(52) U.S. Cl.
CPC ............... *F02K 1/386* (2013.01); *F02K 1/48* (2013.01); *F02K 1/80* (2013.01); *F02K 3/06* (2013.01);
(Continued)

(58) Field of Classification Search
CPC ... F02K 1/386; F02K 1/48; F02K 1/80; F05D 2230/642; F05D 2260/30; F05D 2260/964;
(Continued)

(56) References Cited

U.S. PATENT DOCUMENTS 4,907,743 A * 3/1990 Bouiller .................... F02K 1/04
                                                   239/265.11
6,012,281 A   1/2000 Hauser
(Continued)

FOREIGN PATENT DOCUMENTS

EP      3032083 A1     6/2016
WO   WO2013121150 A1   8/2013
WO   WO2013163510 A1   10/2013

OTHER PUBLICATIONS

German Search Report dated May 5, 2017 from counterpart German App No. 10 2016 217 033.3.
(Continued)

*Primary Examiner* — Todd E Manahan
*Assistant Examiner* — Edwin Kang
(74) *Attorney, Agent, or Firm* — Shuttleworth & Ingersoll, PLC; Timothy Klima

(57) ABSTRACT

A mixer assembly group for a turbofan engine, having a primary flow channel extending along a central axis of the turbofan engine and a secondary flow channel. The mixer assembly group includes a mixer for guiding a first fluid flow from the primary flow channel and a second fluid flow from the secondary flow channel in the direction of an exhaust of the turbofan engine, as well as for intermixing the first and second fluid flows, and a connection appliance, which has at least one connection component that is fixated at the mixer and by means of which the mixer assembly group is to be fixated at two different first and second engine components of the turbofan engine, with are subject to operating temperatures of different heights during operation of the turbofan engine.

10 Claims, 23 Drawing Sheets

(51) Int. Cl.
*F02K 1/48* (2006.01)
*F02K 1/80* (2006.01)
*F02K 3/06* (2006.01)

(52) U.S. Cl.
CPC .... *F05D 2220/32* (2013.01); *F05D 2230/642* (2013.01); *F05D 2250/61* (2013.01); *F05D 2250/75* (2013.01); *F05D 2260/30* (2013.01); *F05D 2260/964* (2013.01); *F05D 2300/501* (2013.01); *F05D 2300/6033* (2013.01); *Y02T 50/60* (2013.01)

(58) Field of Classification Search
CPC ......... F05D 2300/6033; F05D 2240/91; Y02T 50/672; F02C 7/20; F01D 25/28; F01D 25/243
See application file for complete search history.

(56) References Cited

U.S. PATENT DOCUMENTS

| | | | |
|---|---|---|---|
| 9,255,523 | B2 | 2/2016 | Todorovic et al. |
| 2008/0115484 | A1 | 5/2008 | Conete et al. |
| 2010/0126183 | A1* | 5/2010 | Conete ............... F02K 1/386 60/796 |
| 2010/0205930 | A1* | 8/2010 | Conete ............... F02K 1/04 60/226.1 |
| 2015/0083822 | A1 | 3/2015 | Mecuson et al. |

OTHER PUBLICATIONS

European Search Report dated Jan. 23, 2018 for counterpart European Patent Application No. 17187905.9.

* cited by examiner

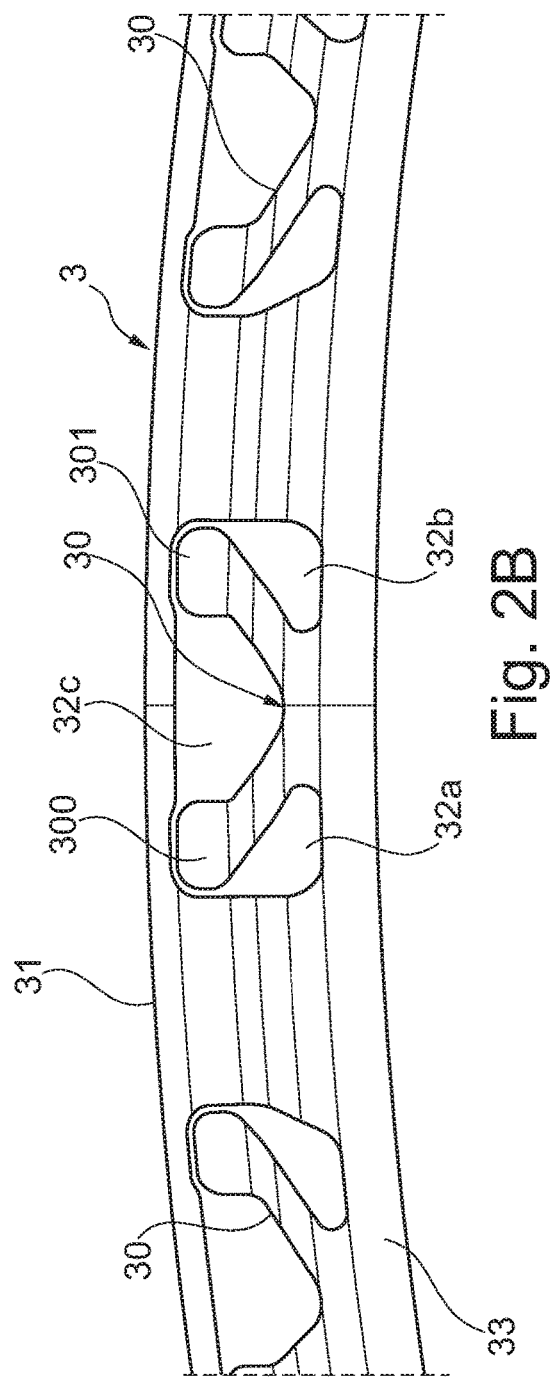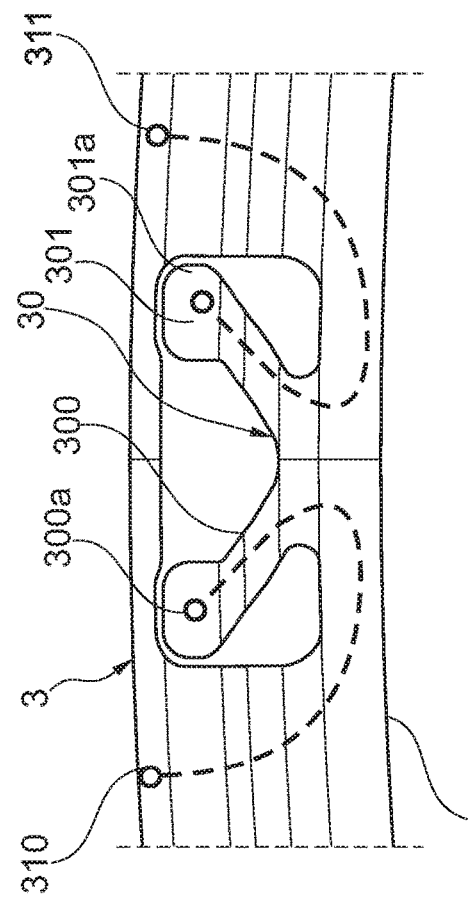

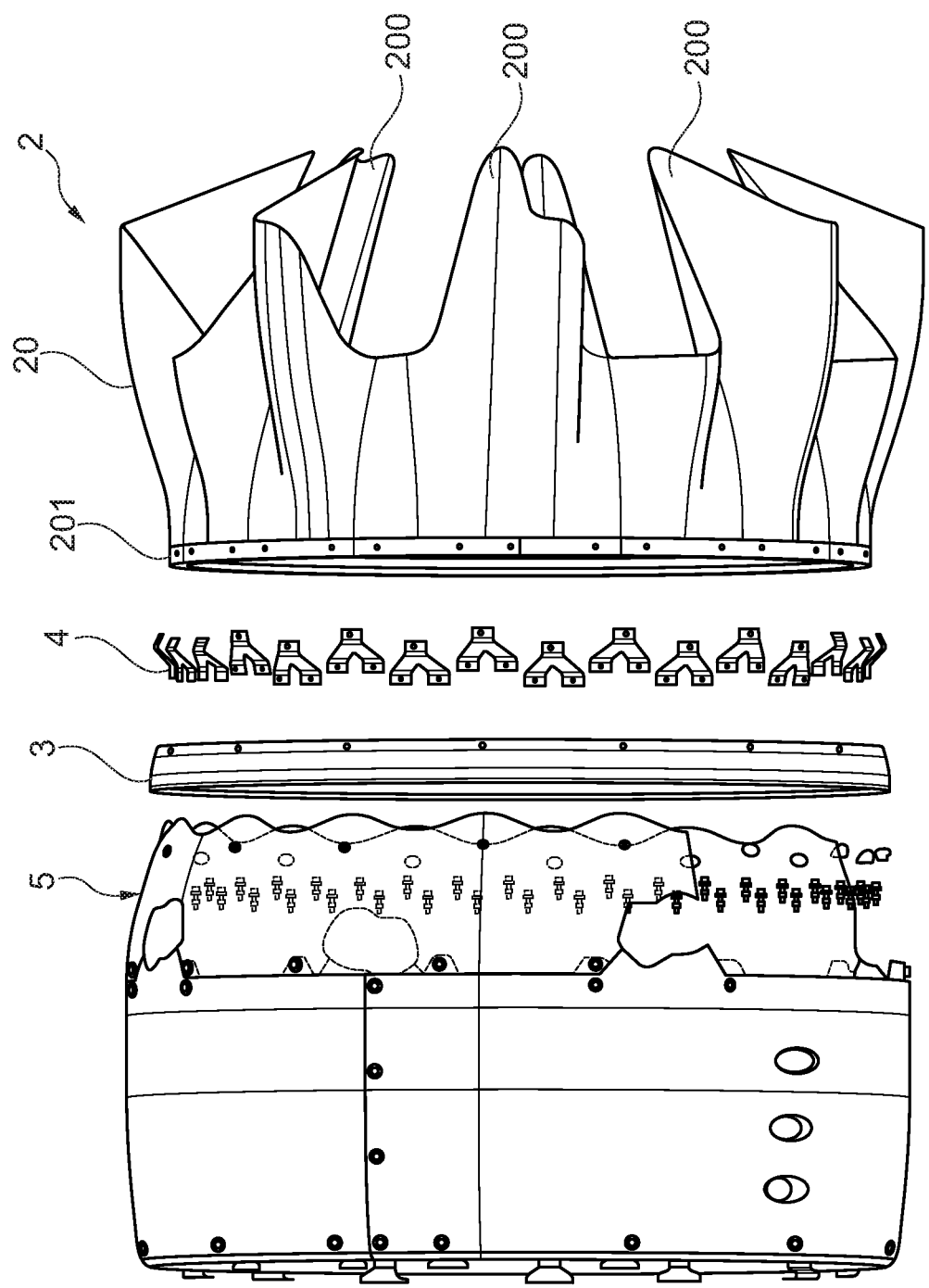

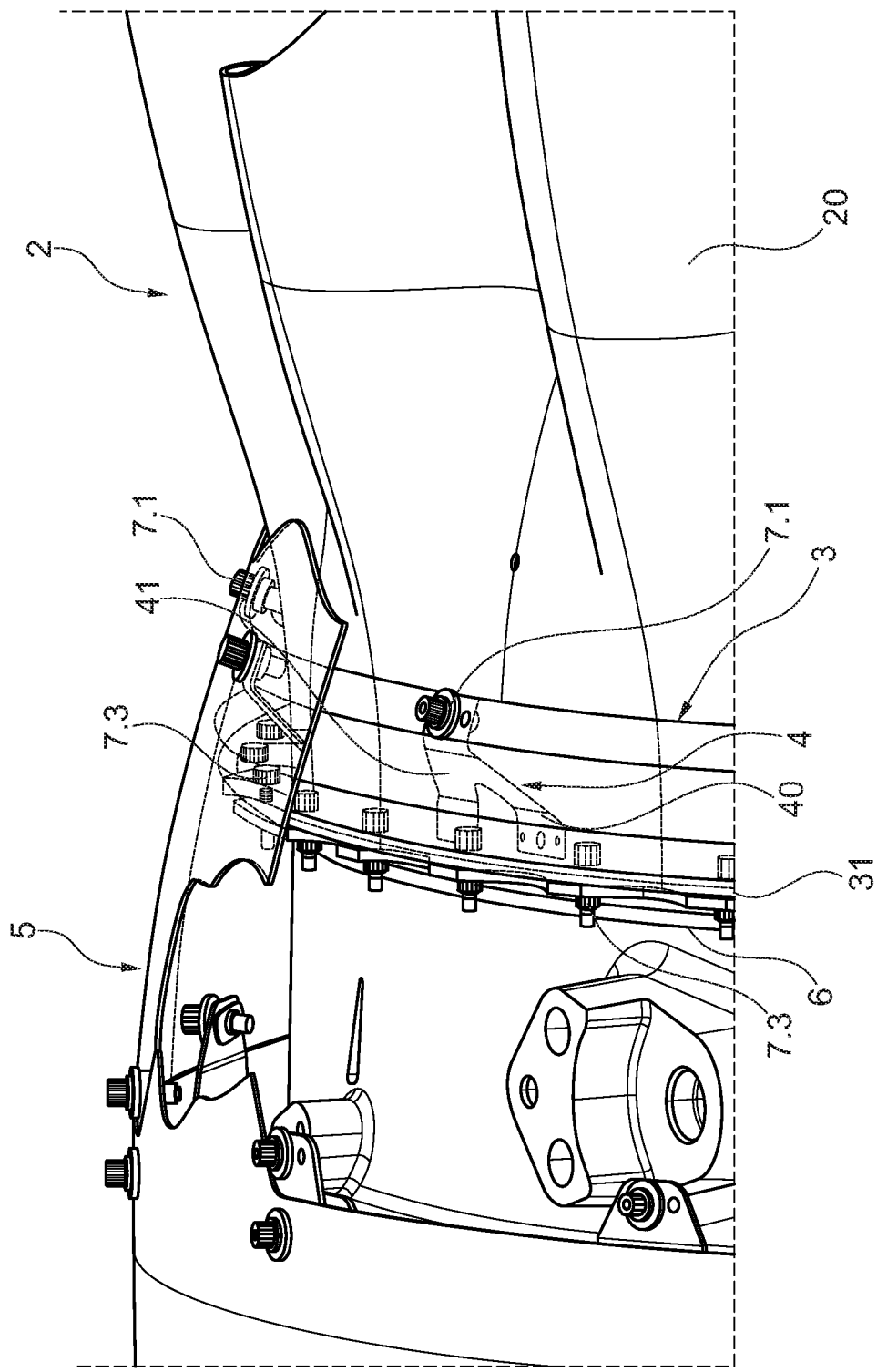

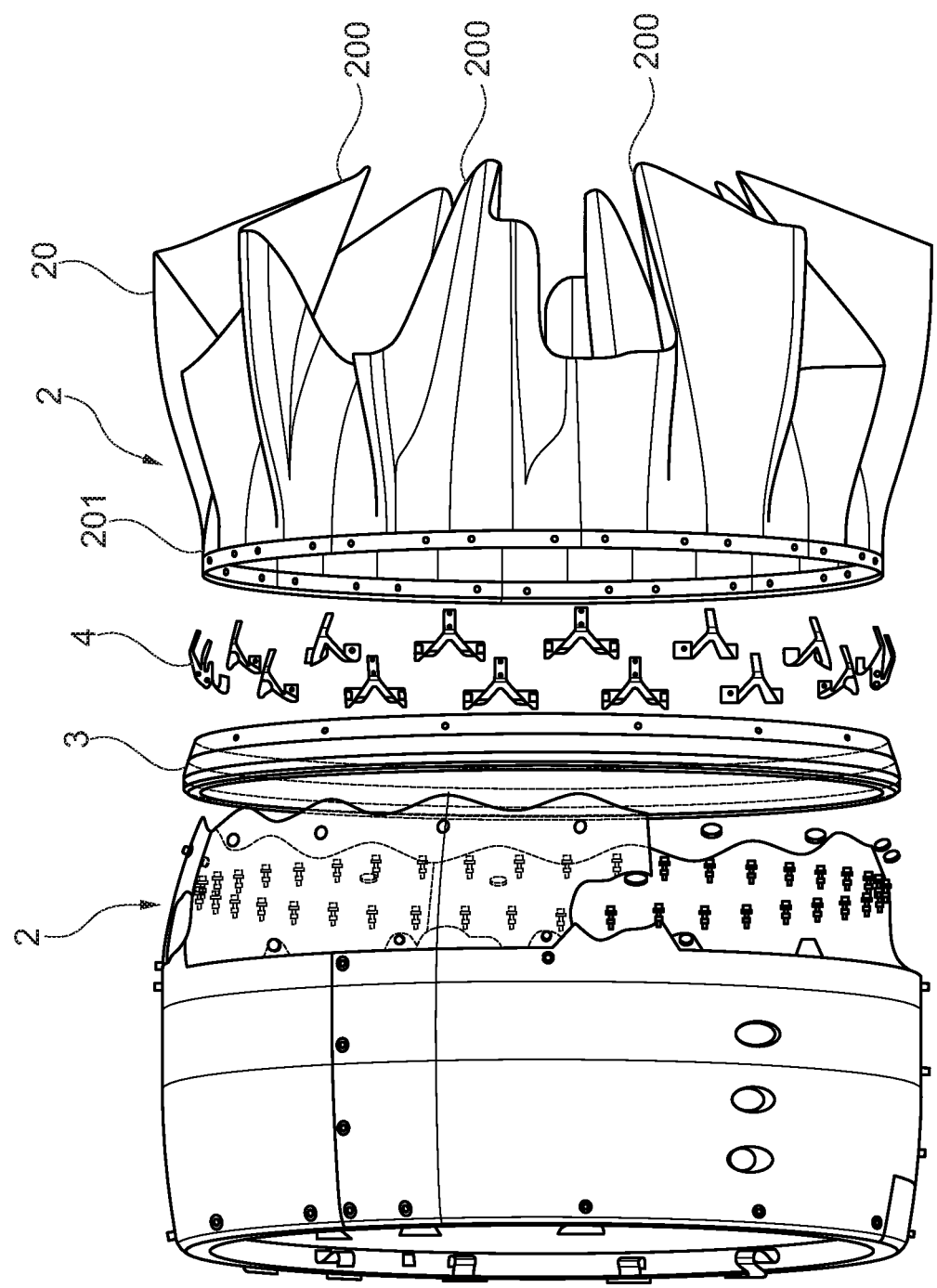

MIXER ASSEMBLY GROUP FOR A TURBOFAN ENGINE

REFERENCE TO RELATED APPLICATION

This application claims priority to German Patent Application No. 10 2016 217 033.3 filed on Sep. 7, 2016, the entirety of which is incorporated by reference herein.

BACKGROUND

The invention relates to a mixer assembly group for a turbofan engine.

In a turbofan engine that has a primary flow channel extending along a central axis and a secondary flow channel in the area of an exhaust of the turbofan engine, it is known to provide a mixer assembly group with an (exhaust) mixer in order to guide a first fluid flow from the primary flow channel and a second fluid flow from the secondary flow channel in the direction of the exhaust, as well as to intermix the first and second fluid flows. The obtainable thrust can be increased and the engine noise can be reduced through such a mixer assembly group as a part of an exhaust mixing system, by means of which a first warm or hot primary fluid flow and a second cooler secondary fluid flow are intermixed.

What is for example known from EP 3 032 083 A1 in this context is a mixer assembly group for a turbofan engine that comprises a mixer with a blossom-shaped or meander-shaped contour (also referred to as a "lobed mixer" in technical jargon). At that, the mixer is preferably made of a ceramic fiber reinforced composite or a ceramic matrix composite (CMC in short), and facilitates an efficient intermixing of a primary fluid flow from a primary flow channel of the core engine of the turbofan engine that is warm or hot during operation with a cooler secondary fluid flow from the secondary or bypass channel, before both fluid flows flow outwards over an outlet cone at an exhaust nozzle of the turbofan engine. The fixation of the separately manufactured mixer at one or multiple engine components in the area of the exhaust is realized at an interface of the mixer assembly group, for example at a support component of a low-pressure turbine of the core engine with a ring-shaped flange section.

What is already known from practice in this context for the purpose of arranging the mixer in a turbofan engine is to provide a fixation at two different engine components which are, on the one hand, associated with the primary flow channel and, on the other hand, with the secondary flow channel so as to let the mixer adjoin the primary flow channel as well as the secondary flow channel, and to guide the respective fluid flows at the end of the respective channel via and by means of the mixer. What can for example be provided in this way is a fixation of a mixer assembly group comprising the mixer at a first engine component that is formed by a casing of the low-pressure turbine and thus defines a radially inner wall of the secondary flow channel. A further fixation of the mixer assembly group can also be provided at a second engine component associated with the primary flow channel. Such a second engine component can for example be a support component for the exit guide vanes or the guide wheel at the exhaust of the low-pressure turbine.

However, a disadvantage of fixating the mixer assembly group at two engine components that are associated, on the one hand, with the primary fluid flow and, on the other, with the secondary fluid flow is that these engine components are subjected to operating temperatures of different heights during operation of the turbofan engine. The fixation of the mixer assembly group comprising the mixer is realized at engine components that are subject to extreme temperature gradients during operation of the turbofan engine. Due to these sometimes considerable temperature differences, comparatively strongly varying thermal expansions and associated strong component loads through thermal stress occur in particular at a connection appliance by means of which the mixer assembly group is fixated at different engine components.

SUMMARY

Therefore, it is the objective of the present invention to provide a mixer assembly group for a turbofan engine that is improved in this aspect, and in particular allows for an improved connection to different engine components of a turbofan engine that are subject to operating temperatures of different heights during operation of the turbofan engine.

This objective is achieved by a mixer assembly group with features as described herein.

According to the invention, the connection appliance for fixating the mixer assembly group has at least one connection component that is fixated at the mixer at least at one first attachment location. Further, at least one second and at least one third attachment location for the connection of the mixer assembly group to the first engine component and the second engine component are defined through the connection appliance. Here, it is provided according to the invention that the first, second and third attachment locations are axially offset with respect to one another regarding the central axis of the turbofan engine, and via the at least one connection component that is fixated at the first attachment location, the mixer is supported in a radially displaceable manner in relation to the first engine component as well as in relation to the second engine component with respect to the central axis of the turbofan engine, when the mixer assembly group is fixated at the second and third attachment locations at the first and second engine component according to the intended use.

In one variant of the invention, the connection component of the connection appliance that is fixated at the mixer has a V-shaped contour, or the connection component fixated at the mixer comprises at least one attachment section with a V-shaped contour. In that case, a leg of the V-shape is fixated—for example via a free end of this leg—or a base of the V-shape connecting the two legs is fixated at the mixer at the at least one first attachment location. Through a connection component that has a V-shaped contour or a connection component with a V-shaped attachment section, a desired elasticity for the connection of the mixer at the first and second engine components can be introduced in a comparatively simple manner, without impacting the rigidity and strength of the overall system in a negative manner.

Through the radial displaceability, it is possible to compensate differently strong thermal expansions of the first and second engine components resulting from the different operating temperatures that these components are subjected to during operation of the turbofan engine. Further, by means of the connection appliance and in particular its connection component, a comparatively rigid connection of the mentioned components to each other is provided in the axial direction (with respect to the central axis) through the axial offset of the first, second and third attachment locations, at which a connection to the mixer, on the one hand, and to the first and second engine components, on the other hand, is realized. Thus, the flexibility in the radial direction as it is introduced by the connection appliance and the at least one connection component for compensating differing thermal expansions, does not compromise a durably stable and rigid arrangement of the mixer at the two engine components with respect to the axial direction.

Since the mixer is usually also subjected to a comparatively high operating temperature due to the contact with the warm or hot first (primary) fluid flow from the primary flow channel, it is achieved through the division into a first, second and third attachment location for the connection to the different components (mixer, first engine component, second engine component) that the components of the connection appliance can bridge the occurring temperature gradients between engine components with different temperatures and the mixer in a more effective manner. A temperature development across the components of the connection appliance between the individual attachment locations can be influenced in a targeted manner and taken into account more effectively when designing the components.

In one embodiment variant, the mixer is elastically supported in a radially displaceable manner via the at least one connection component with respect to the central axis of the turbofan engine. In this way, a certain degree of elasticity is introduced into the mixer system by means of the at least one connection component in order to allow for an elastic displacement of the mixer relative to the first and second engine components, as it occurs as a result of the temperature.

In one embodiment variant, a comparatively thin-walled metallic connection component with a very small local area moment of inertia can be used due to the V-shape, and thus can be bent in a comparatively simple manner, i.e. by applying a comparatively small force. This (local) bending property is advantageous with respect to the differing component temperatures of the components that are connected to the connection component, and thus the different temperatures that are applied at differing sections of the connection component. At the same time, through the arrangement of multiple V-shaped connection components or multiple V-shaped attachment sections in a manner distributed about the circumference of the mixer, a framing system for the connection of the mixer can be provided via which the mixer is held axially in a very stable manner, and which allows for a compensation of resulting forces that may be generated due to vibrations and inertial forces in the axial direction as well as in the circumferential direction.

For example, at least one leg of the V-shape can be fixated at the mixer, while a base of the V-shape is provided for a connection to the first engine component at the at least one second attachment location. In that case, the attachment locations for the leg, on the one hand, and for the base, on the other hand, are preferably arranged in a manner radially offset with respect to one another regarding the central axis of the turbofan engine. In that case, a certain radial displaceability of the mixer is provided relative to the first engine component through the leg, which in that case also extends radially at least partially. Through the V-shape and thus through an additional fixation at a second leg, not only an increased rigidity in general can be achieved, but also in particular an improved securing against an axial displacement of the mixer. This particularly applies to a connection component with multiple V-shaped attachment sections that are formed integrally thereat and are circumferentially provided next to each other along the central axis, or are formed like multiple identically designed, respectively V-shaped connection components of a connection appliance that are circumferentially provided next to each other about the central axis.

Instead of fixating at least one leg or both legs of the V-shape at the mixer, it can also be provided that a base of the V-shape is fixated at the mixer and that (a) at least one leg of the V-shape is provided for connecting to the first engine component at the at least one second attachment location and/or (b) at least one leg of the V-shape is connected to another connection component of the connection appliance which is to be connected to the first and/or the second engine component at the first and/or second attachment location. Consequently, in this variant, a base that connects the two legs of the V-shape is fixated at the mixer, and at least one leg—possibly both legs—extends from the base at least partially also in the radial direction to the first engine component or to another connection component that is connected to the first and/or the second engine component, when the mixer assembly group is mounted according to the intended use. This also includes a variant in which the base of the V-shape is fixated at the mixer, a first leg is to be connected to the first engine component, and a second leg is connected to another connection component of the connection appliance, which in turn is itself to be connected to the first and/or the second engine component.

In one embodiment variant, the first attachment location, at which the at least one connection component is fixated at the mixer, is radially offset with respect to the at least one second attachment location for the first engine component, and/or is radially offset with respect to the least one third attachment location for the second engine component regarding the central axis.

In a further development based thereon, a row of first attachment locations is provided at the mixer, for example, extending along a circumferential direction about the central axis of the turbofan engine, when the mixer assembly group is fixated at the first and second engine components according to the intended use, wherein this row of first attachment locations is located further radially inside than a row of third attachment locations of the second engine component associated with the primary flow channel. Here, the third attachment locations, which are for example provided for a fixation at an annular flange section of the second engine component, are located, with respect to the radial direction, between the row of first attachment locations and a row of second attachment locations for fixation at the first engine component that is associated with the secondary flow channel. Thus, in this embodiment variant, the first, second and third attachment locations are axially as well as radially offset with respect to one another in a cross-sectional view through the central axis of the turbofan engine in the mounted state of the mixer assembly group according to the intended use.

In one embodiment variant, one connection component or also multiple—preferably identically embodied—connection components of the connection appliance have two sections that are embodied in one piece with one another, wherein one section is fixated at the mixer at the at least one first attachment location, and the other section is provided at the at least one second or third attachment location for connection to the first and second engine components. This variant in particular comprises a connection component with a V-shaped contour as well as a connection component with a V-shaped attachment section that is embodied in one piece with a further section for the connection to one of the first and second engine components.

In general, the connection appliance can comprise a connection component in the shape of a ring or in the shape of a ring segment that defines the at least one second attachment location for the connection of the mixer assembly group to the first engine component and/or the at least one third attachment location for the connection of the mixer assembly group to the first engine component. Here, in one embodiment variant, a connection component in the shape of a ring or in the shape of a ring segment defines respectively multiple second and third attachment locations, for example through bores that are respectively arranged preferably in an equidistant manner behind each other along a circumference. Here, a ring-shaped connection component can in particular be embodied as a sealing diaphragm.

In one embodiment variant, a connection component in the shape of a ring or a ring segment is provided with multiple first attachment V-shaped sections that are respectively fixated at the mixer. At that, the first V-shaped attachment sections are formed integrally at the connection component in the shape of a ring or a ring segment. Further, the at least one further attachment section formed in one piece with multiple (at least two) first attachment sections is provided for connecting to the first or second engine component. For example, multiple fastening clips with a V-shaped contour are cut free at the connection component in the shape of a ring or a ring segment, with their legs being fixated at the mixer and their base being respectively formed by the continuous attachment section in the shape of a ring or a ring segment. Extending from this continuous attachment section [of the] connection component, which respectively serves as a base, are the V-shaped attachment sections that are arranged along the circumference of the connection component next to each other, respectively in the kind of a free-cut V-shaped lug or tongue.

For example, such a connection component in the shape of a ring or a ring segment can integrally form at least three different attachment sections for connecting to the mixer and the first and second engine components:
1. a front attachment section for connection to the second engine component of the primary flow channel at an upstream face side of the connection component in the shape of a ring or a ring segment,
2. a further rear attachment section for connection to the first engine component of the secondary flow channel at a downstream face side of the connection component in the shape of a ring or a ring segment, and
3. located between the two face sides, at least one V-shaped further attachment section for connection to the mixer, preferably multiple V-shaped lug-like attachment sections that are provided between the two face sides and are located next to each other in the circumferential direction.

In an alternative variant of the invention, the connection appliance comprises at least two separately manufactured connection components, wherein
  a first connection component is provided for the connection of the mixer assembly group to the first and second engine components at second and third attachment locations, and
  at least one further second connection component, which is fixated at the mixer at the at least one first attachment location and via which the mixer can be supported in a displaceable manner relative to the first and second engine components, (a) is connected to the other first connection component and/or (b) is also to be connected to the first and second engine components.

For reducing the mounting effort, in one variant the second connection component is connected to the first engine component in the area of that second attachment location(n) at which also the other connection component is to be connected to the first engine component in order to fixate the mixer assembly group at the first and second engine components according to the intended use. Accordingly, instead of a single connection component that is connected to the mixer and the first and second engine components at first, second and third attachment locations via sections that are formed in one piece with one another, a structural separation is provided in this variant. The fixation of the mixer assembly group at the first and second engine components is predetermined through a first connection component of the connection appliance, and the connection at the mixer as well as the provision of the desired radial flexibility is obtained through a second connection component.

For example, it is provided in one variant that a first connection component in the shape of a ring or a ring segment is provided for the fixation at the first and second engine component. In this case, it e.g. also provides a seal that prevents fluid from getting, from the primary flow channel and past the first connection component in the shape of a ring or a ring segment, in between the two engine components. In that case, multiple second connection components are provided for connecting the mixer of the mixer assembly group with a sufficient radial flexibility and the desired axial rigidity, with the second connection components being arranged next to each other along a circumferential direction about the central axis, and being connected to only one of the engine components and/or the first connection component. At that, the multiple second separately manufactured connection components can respectively have a V-shaped contour (in top view), as has already been described in a generalized manner for the design of a connection component.

Accordingly, it can be provided in a possible further development that the first connection component for the connection of the mixer assembly group to the first and second engine components has the shape of a ring or a ring segment, and that multiple second V-shaped and separately manufactured connection components are respectively provided, which are respectively
(a) fixated at the mixer at least at one first attachment location for example via the two legs of the V-shape or a base connecting the two legs—and
(b) connected to the connection component in the shape of a ring or a ring segment via the base or the two legs (b1) and/or (b2) are to be connected to one of first and second engine components.

In one embodiment variant with at least one first connection component and preferably multiple separate second connection components, it is provided that the first connection component for the connection of the mixer assembly group to the first and second engine components extends across at least one second connection component that is fixated at the mixer at the at least one first attachment location. Thus, with respect to the mounted state of the mixer assembly group at the engine according to the intended use, the first connection component is located further radially outside and covers the at least one further connection component. In particular, a covering of multiple second connection components that are arranged next to each other along a circumference about the central axis can be provided by a single first connection component. Consequently, in this case, each second connection component is arranged in a radially extending intermediate space between the first connection component and a connection area of the mixer at which the second connection components are fixated. Consequently, the second connection components are, preferably completely, accommodated in a space-saving manner inside the intermediate space. Therefore, the axial extension of the entire connection appliance for fixating the mixer assembly group comprising the mixer is comparatively small, and is significantly predetermined by the axial extension of a first connection component in the shape of a ring or a ring segment, for example. Thus, the connection appliance has a comparatively compact construction.

In an exemplary embodiment, a separate second connection component forms an attachment section for the connection (a) to the first connection component and/or (b) to the first engine component, as well as at least one connecting leg that extends away from this attachment section. The connecting leg is fixated at the mixer at the at least one first attachment location, and in its extension from the attachment section to the first attachment location has a curvature of more than 90° in at least one area. Via the curved and for example bent area of the connecting leg, it is possible to provide axial rigidity and radial flexibility which are significantly influenced by the second connection component, without having to forego a compact construction, in particular with respect to the axial extension, since such a second connection component barely takes up any additional installation space or requires no additional installation space at all in the axial direction as compared to a second connection component without a partially curved connecting leg. In a possible exemplary embodiment, it is provided that one or two connecting legs of the second connection component respectively have an area with a curvature of more than 90°, e.g. of more than 135°.

According to a further variant of the invention, through the connection appliance, an axial minimum distance of the mixer to the second engine component is predetermined, so that a gap, in particular a ring-shaped gap, is defined between the mixer and the second engine component, when the mixer assembly group is fixated at the first and second engine components according to the intended use. The second engine component is preferably an engine component that is associated with the core engine and thus with the primary flow channel, and to which the mixer directly connects in the flow direction of the fluid flowing inside the primary flow channel. Here, a defined spatial separation between components that are subjected to different thermal loads is achieved in a targeted manner through the specification of a defined gap between the second engine component and the mixer. What is further achieved in this way is an axial decoupling of the structural component for better dynamic damping properties of the mixer. Further, a leakage flow can be permitted in this manner, so that warm or hot fluid from the primary flow channel at the upstream face side of the mixer can already flow along the outer side of the mixer, contributing to the intermixing of the fluid flow from the primary and secondary flow channels. Further, enabling a leakage flow in a targeted manner can lead to an improved, thus additionally supporting ('re-energized'), flow of the (cold) second fluid flow of the secondary flow channel in the area of the mixer assembly group. The predetermined, preferably ring-shaped, gap for example has a width of 1 to 2 mm, and does not exceed a width of 2.5 to 3 mm, in one variant of 2 mm.

For connecting the mixer assembly group to the second engine component, at least one distance piece can be provided to hold the mixer at the predetermined axial minimum distance to the second engine component, when the mixer assembly group is fixated at the first and the second engine component according to the intended use. Such a distance piece can for example be a spacer ring that extends about the central axis of the turbofan engine in the mounted state, and is for example arranged between a flange section of the second engine component and an attachment section of a connection component of the connection appliance.

In one embodiment variant, the mixer has a blossom-shaped or meander-shaped contour, with its guide elements serving for guiding the first and second fluid flows of the primary flow channel and of the secondary flow channel along a circumferential direction about the central axis, preferably in an alternating manner radially inwards (in the case that the fluid flow is guided radially outside) and radially outwards (in the case that the fluid flow is guided radially inside) so as to intermix them. Through such a contour, a mixer with a large-volume mixer geometry, which is usually referred to as a "lobed mixer", can be obtained.

Alternatively or additionally, the mixer has guide elements of differing axial lengths for guiding the first and the second fluid flow, with short and long guide elements alternating along the circumference of the mixer, which may possibly be provided with a meander-shaped contour.

The mixer of the mixer assembly group can be manufactured at least partially of a fiber reinforced composite. With a view to make the weight of the mixer as low as possible, it is made of a ceramic matrix composite (CMC), for example.

A turbofan engine with a primary flow channel extending along a central axis and a secondary flow channel can be provided, in which a mixer assembly group according to the invention is used in the area of an exhaust of the turbofan engine in order to intermix fluid flows from the primary and secondary flow channel and to guide them in the direction of the exhaust, wherein the connection of the mixer to second engine components with different operating temperatures is considerably improved.

BRIEF DESCRIPTION OF THE DRAWINGS

The attached Figures illustrate possible embodiment variants of the solution according to the invention by way of example.

FIGS. 2A-2C show, in different views, a further embodiment variant of a mixer assembly group according to the invention with a connection appliance, having a single connection component in the form of a connecting ring for fixating the mixer assembly group at engine components of the turbofan engine.

FIG. 6A shows an exploded view of a further embodiment variant of a mixer assembly group according to the invention together with a first engine component at which the mixer assembly group is fixated.

FIG. 6B shows, in sections, the mixer assembly group of FIG. 6A that is mounted at the two engine components.

FIG. 8A shows an exploded view of a further embodiment variant of a mixer assembly group according to the invention together with a first engine component at which the mixer assembly group is fixated.

DETAILED DESCRIPTION

Figure 11:
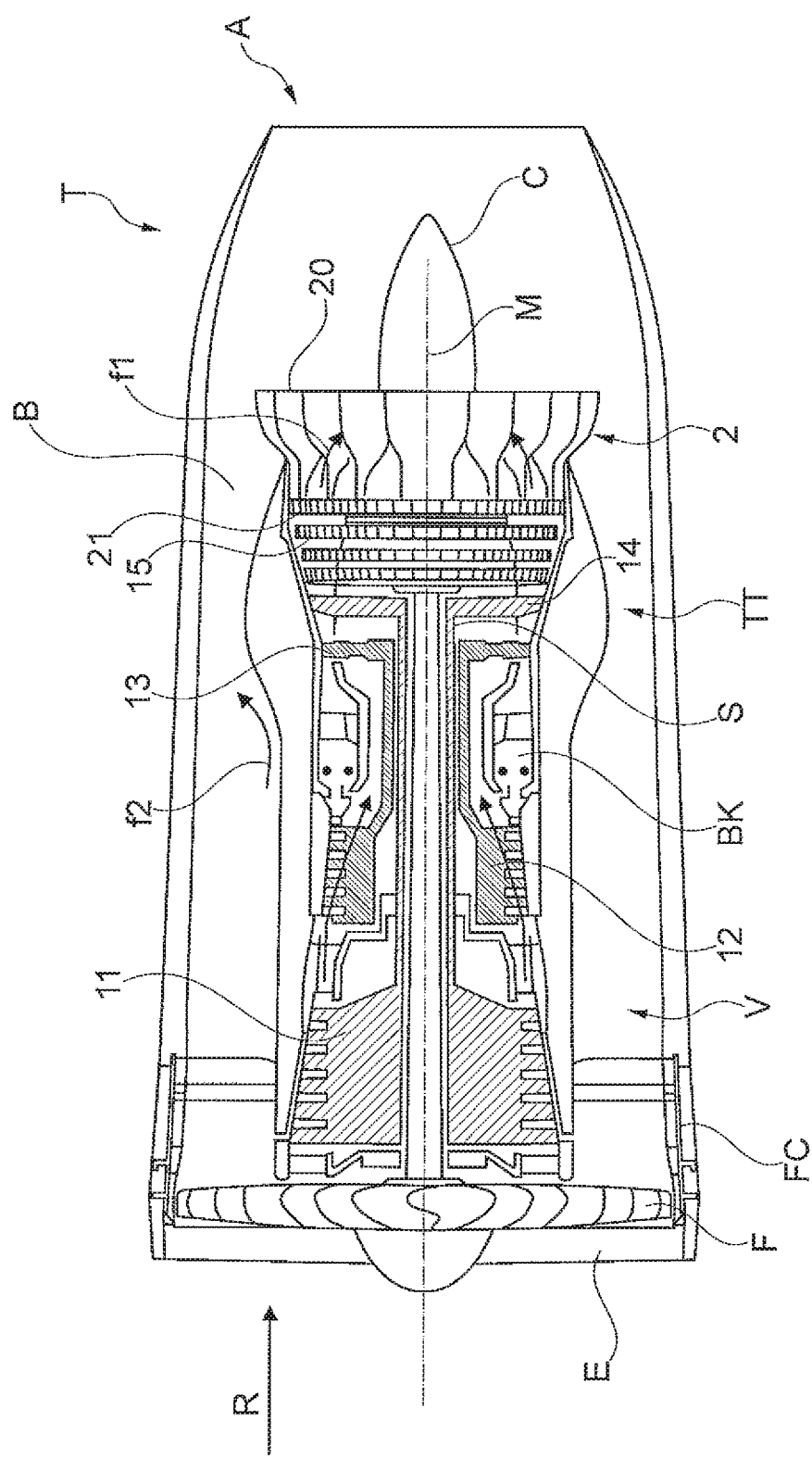
FIG. 11 shows a cross-sectional view of a turbofan engine according to the invention with a mixer assembly group in the area of an exhaust of the turbofan engine.
Figure 12:
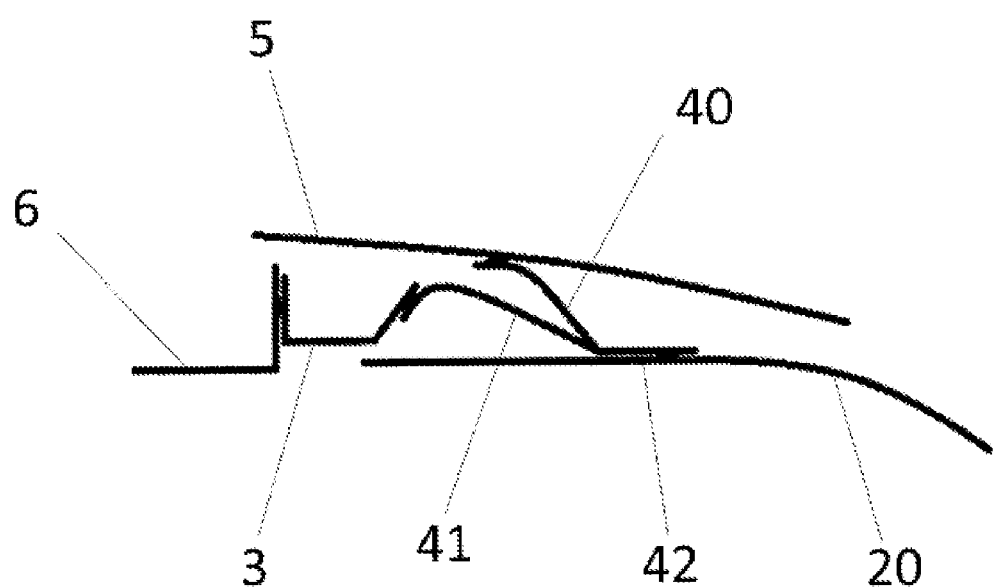
FIG. 12 shows a schematic view of a variant.

FIG. 11 illustrates, in a schematic manner and in sectional view, a (turbofan) engine T in which the individual engine components are arranged behind one another along a rotational axis or central axis M. At an inlet or intake E of the engine T, air is sucked in along an entry direction R by means of a fan F. This fan F, which is arranged inside a fan housing FC, is driven by a rotor shaft S that is set into rotation by a turbine TT of the engine T. Here, the turbine TT connects to a compressor V, which for example has a low-pressure compressor 11, and a high-pressure compressor 12, as well as possibly also a medium-pressure compressor. The fan F supplies air to the compressor V, on the one hand, as well as, on the other hand, to a secondary flow channel or bypass channel B for creating a thrust. Here, the bypass channel B extends about a core engine that comprises the compressor V and the turbine TT, which also comprises a primary flow channel for the air that is supplied by the fan F to the core engine.

The air that is conveyed via the compressor V into the primary flow channel enters a combustion chamber section BK of the core engine, in which the driving energy for driving the turbine TT is generated. For this purpose, the turbine TT has a high-pressure turbine 13, a medium-pressure turbine 14, and a low-pressure turbine 15. Through the energy released during combustion, the turbine TT drives the rotor shaft S and thus the fan F to generate the required thrust by means of the air that is conveyed into the bypass channel B. The air from the bypass channel B as well as the exhaust from the primary flow channel of the core engine are discharged via an exhaust A at the end of the engine T. Here, the exhaust A usually has a thrust nozzle with a centrally arranged outlet cone C.

In particular for the purpose of noise reduction, a mixer 20 is provided in the area of the exhaust A as part of an mixer assembly group 2. A first fluid flow f1 from the primary flow channel that is discharged form the core engine behind the low-pressure turbine 15 and a second fluid flow f2 from the bypass channel B are intermixed by this mixer assembly group 2 and its mixer 20. For this purpose, parts of the first (primary) fluid flow f1 from the core engine are alternatingly guided outwards and the second (secondary) fluid flow f2 from the bypass channel B is guided inwards via a blossom-shaped or meander-shaped contour of the mixer 20. In this manner, segments of hot and cold flow zones are created, and an intermixing of the two fluid flows f1 and f2 is achieved. Due to turbulences occurring during intermixing, low-frequency noise is reduced and high-frequency noise is amplified, so that the audible nose range is reduced as a result.

In the present case, the mixer 20 is preferably manufactured from a fiber reinforced composite, in particular a ceramic matrix composite, and, in the embodiment variant of FIGS. 1A to 10 that will be explained in more detail in the following, has guide elements 200 of differing axial lengths defining the meander-shaped contour of the mixer 20 and being formed in the kind of alternating lobes and gulleys. Via these guide elements 200, the first and second fluid flows f1 and f2 from the primary flow channel of the core engine and the bypass channel B are alternatingly guided outwards and inwards to obtain the desired intermixing of the fluid flows f1 and f2.

The connection of the mixer assembly group 2 is realized in the area of an interface 21 at the engine components of the core engine. In practice, this entails considerable difficulties. Suitable for effectively guiding the fluid flows f1 and f2 from the primary flow channel and the bypass channel B is for example a connection of the mixer assembly group 2 to a first engine component associated with the bypass channel B as well as to a second engine component associated with the primary flow channel. For example, a first engine component is formed by a casing component 5 of the core engine in the area of the low-pressure turbine 15 which forms a radially inner wall of the bypass channel B or is located adjacent to the same (c.f. FIG. 6B, for example). A second engine component may for example be a support component 6 of the low-pressure turbine 15, at which guide vanes are supported or a guide wheel is defined at the exit of the low-pressure turbine 15.

However, during operation of the turbofan engine T, the two engine components that are associated, on the one hand, with the primary flow channel and, on the one hand, with the bypass channel B and at which the mixer assembly group 2 is to be fixated, are subject to different operating temperatures. So it is not uncommon that the second engine component, past which the first hot fluid flow f1 of the primary flow channel is guided, is heated up more than the other first engine component, past which the second fluid flow f2 of the bypass channel B is guided, by more than at least 400 to 500° C. As a result, differently strong thermal expansions and comparatively great temperature gradients occur in the area of the interface 21 of the mixer assembly group 2, putting considerable strain on the different component connections.

The solution according to the invention aims at providing a solution in this respect, with different embodiment variants being illustrated in the attached FIGS. 1A to 10 by way of example.

In each of the shown embodiment variants of FIGS. 1A to 10, a connection appliance with at least one connection component 3 or multiple connection components 3, 4 is provided, by means of which the mixer 20 of the mixer assembly group 2 is fixated at least at two different engine components 5, 6 that are subjected to operating temperatures of different heights during operation of the turbofan engine T, and is radially displaceable with respect to these two engine components 5, 6 so as to compensate thermal expansions of varying strengths in the two engine components 5, 6 during operation of the turbofan engine T. At that, at least one connection component 3 or 4 of the connection appliance is always fixated at the mixer 20 at least at one first attachment location. Further, the respective connection appliance defines multiple second and third attachment locations via which the mixer assembly group 2 is connected to the two engine components 5, 6 in the mounted state. Here, the first attachment locations for the fixation at the mixer 20 as well as the second and third attachment locations for the fixation at the two differing engine components are axially offset with respect to one another regarding the central axis M, as is in particular illustrated in the cross-sectional views of FIGS. 10, 5, 6C, 7C and 10.

Figure 1A:
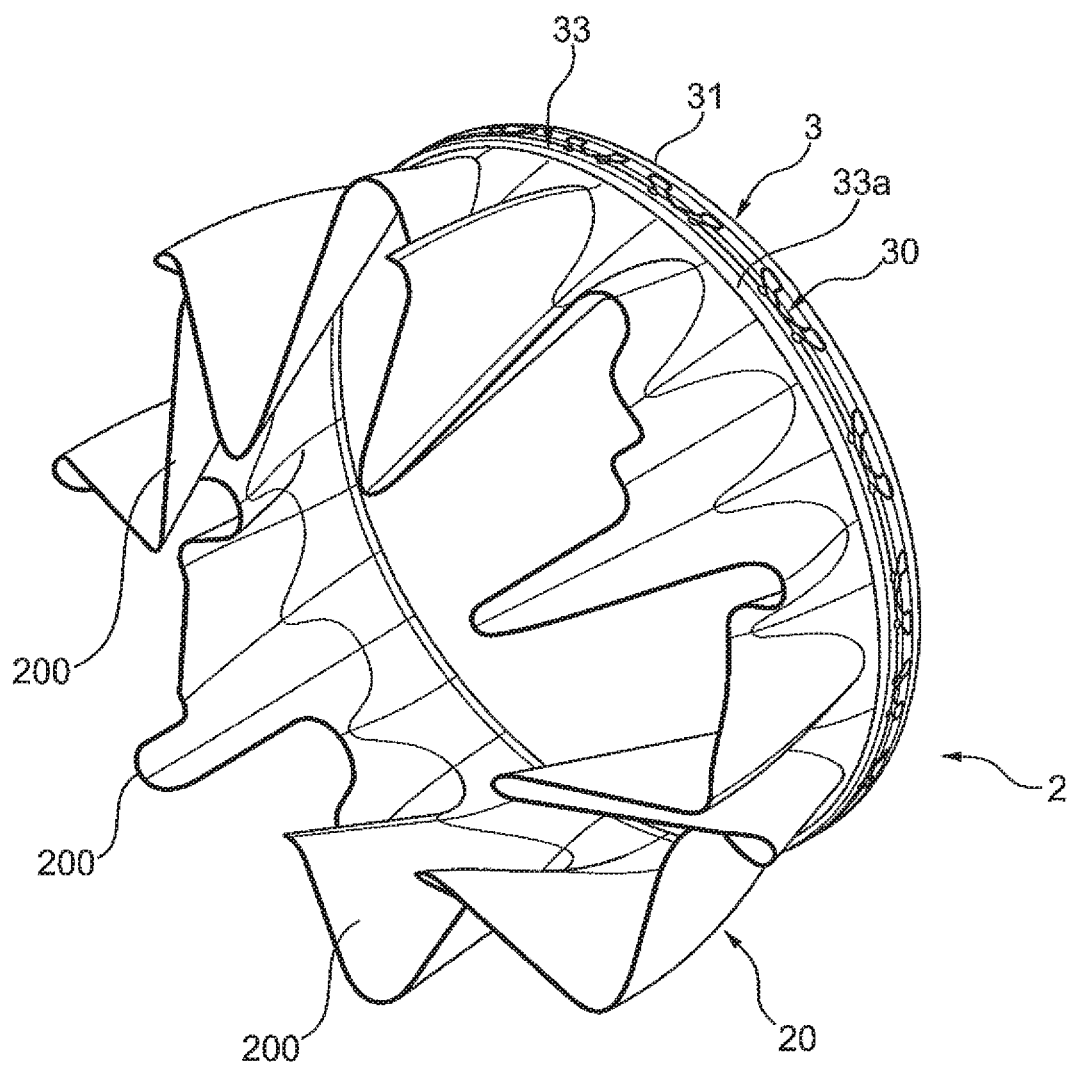
FIG. 1A shows a first embodiment variant of a mixer assembly group according to the invention with a single connection component of a connection appliance for connecting the mixer assembly group at two support components of a turbofan engine.
Figure 1B:
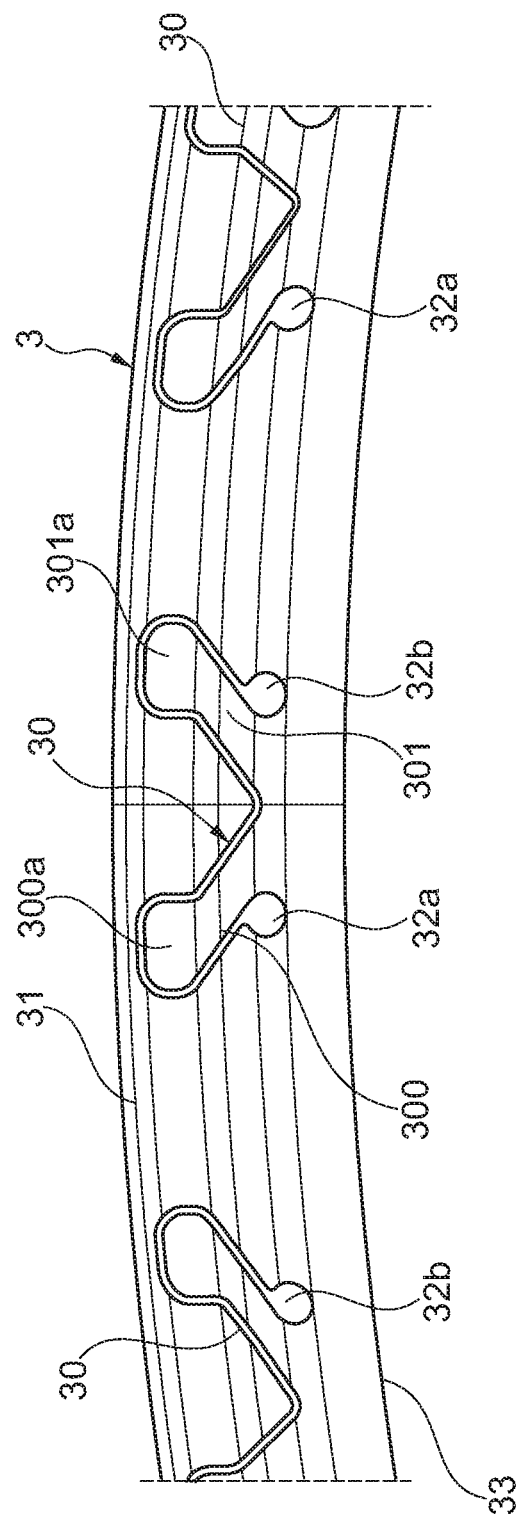
FIG. 1B shows, in sections, the connection component of the mixer assembly group of FIG. 1A, which is designed as a connecting ring and has multiple attachment sections integrated thereat and designed as fastening clips with a V-shaped contour for the fixation at a mixer of the mixer assembly group.
Figure 1C:
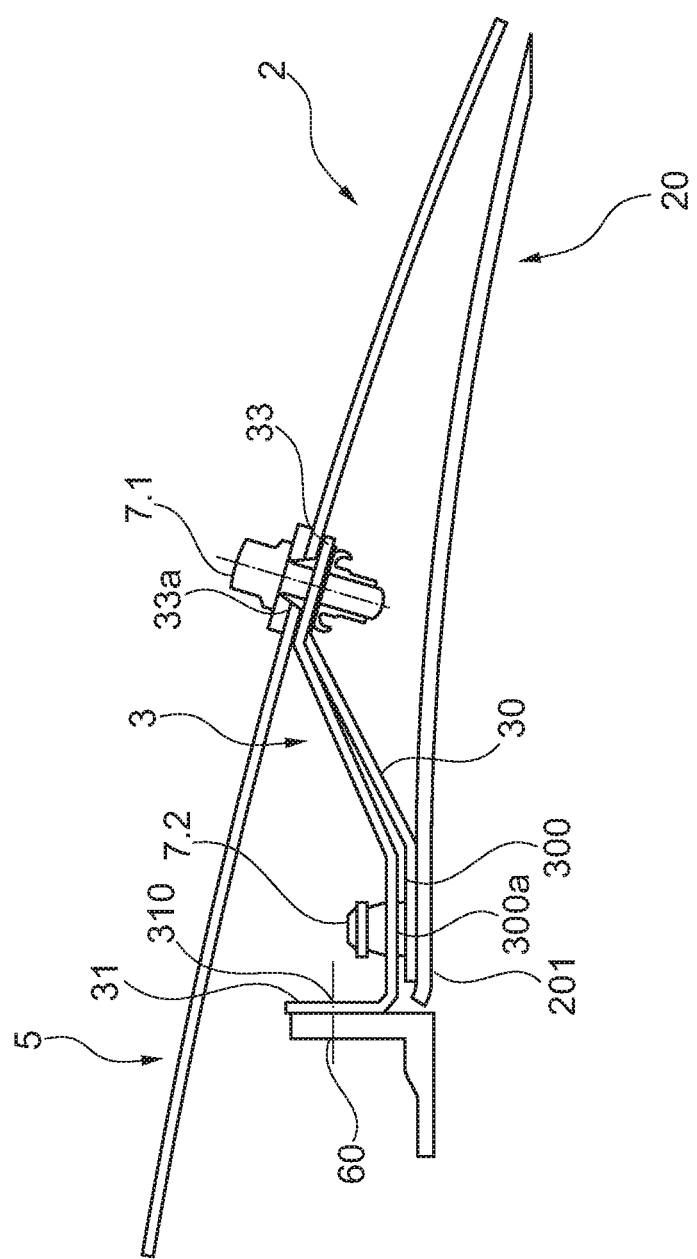
FIG. 1C shows, in sections, a cross-sectional rendering of the mixer assembly group of FIG. 1A that is mounted at engine components of a turbofan engine.

For example, in the embodiment variant of FIGS. 1A, 1B and 1C, a connection appliance for the mixer assembly group 2 is formed by a connection component in the form of a connecting ring 3, independently of any additional attachment elements, such as bolts, screws or rivets. This connecting ring 3 forms an at least partially sealing diaphragm between the exit of the low-pressure turbine 15 and the casing component 5 extending in the axial direction to beyond the support component 6. The connecting ring 3 is meant to avoid least partially that fluid from the primary flow channel flows between the two engine components 5, 6 at which the mixer assembly group 2 is fixated. In the present case, these engine components are a casing component 5 of the low-pressure turbine 15 and a support component 6 that is located further radially inside and defines the exhaust of the low-pressure turbine 15 and has a ring-shaped connecting flange 60, corresponding to FIG. 1C and the above explanations.

For fixation at the two engine components 5 and 6, on the one hand, and at a connection area 201 at the outer circumference of the mixer 20, on the other hand, the connecting ring 3 forms multiple attachment sections 33, 31 and 30 that are configured integrally thereat.

At that, multiple first attachment sections 30 for the fixation at the mixer 20 are formed at the connecting ring 3 by respectively cut free fastening clips 30 with a V-shaped contour. Each of these fastening clips 30, which are arranged next to each other along the circumference of the connecting ring 3, has two connecting legs 300 and 301 that extend at an angle to each other and are connected at a common base for forming the V-shaped contour. The base is respectively an integral component of a rear edge of the connecting ring 3 that is facing towards the exhaust A in the mounted state of the mixer assembly group 2. Each pair of connecting legs 300 and 3001 of a fastening clip 30 is supported in an elastically displaceable manner at the respective base, and thus at the circumferentially extending rear edge of the connecting ring 3. Each connecting leg 300, 301 is fixated at the connection area 201 of the mixer 20 at a respective free end. Thus, at their free ends, each connecting leg 300 and 301 forms a first attachment location 300a or 301a for the fixation at the mixer 20. Here, respectively one attachment element 7.2 in the form of a rivet is provided for the fixation at the connection area 201 of the mixer 20, for example.

As can in particular be seen in the cross-sectional view of FIG. 1C, in the mounted state of the mixer assembly group 2 according to the intended use, the casing component 5 extends at least beyond the connection area 201 of the mixer 20 and protrudes with one end section beyond the exit of the low-pressure turbine 15 that is defined by the support component 6. Via its rear edge, the connecting ring 3 is fixated at an inner side of this end section of the casing component 5, namely with an axial offset to the first attachment locations 300a and 301a. In this manner, the rear edge of the connecting ring 3 that is facing towards the exhaust A defines a circumferentially extending attachment section 33 for defining multiple second attachment locations 33a, at which the connecting ring 3 is fixated at a casing component 5, here for example via multiple attachment elements 7.1 in the form of threaded bolts.

At an edge that is facing away from the exhaust A and thus represents a front edge, the connecting ring 3 also forms a circumferentially extending third attachment section in the form of a mounting flange 31. This mounting flange 31 is provided for fixating the mixer assembly group 2 at the support component 6, namely at its connecting flange 60. The mounting flange 31 of the connecting ring 3 thus defines multiple third attachment locations 310 which are arranged next to each other along the circumference of the connecting ring 3, and at which the mixer assembly group 2 is fixated at the support component 6.

In a state where the mixer assembly group 2 it is mounted at the two engine components 5 and 6 according to the intended use, the first attachment locations 300a, 301a, the second attachment locations 33a, and the third attachment locations 310a for connecting the connecting ring 3 to the mixer 20, the casing component 5, and the support component 6 are arranged in a manner axially offset with respect to one another regarding the central axis M. All first attachment locations 300a, 301a, at which the fastening clips 30 are connected to the mixer 20, are located between the second and third attachment locations 33a and 310, at which the connecting ring 3 is fixated at the casing component 5, on the one hand, and at the support component 6, on the other. Also, the first, second and third attachment locations 300a, 301a; 33a and 310 are respectively arranged with at least a small radial offset with respect to each other. Through a thus realized rigid connection of the connecting ring 3 to the casing component 5, on the one hand, and the support component 6, on the other, the mixer 20 of the mixer assembly group 2 is mounted in a comparatively rigid manner with respect to an axial direction relative to the engine components 5 and 6. At the same time, through the individual fastening clips 30 that are fixated at the circumference of the mixer 20 and respectively represent an integral component of the connecting ring 3, the mixer 20 is supported at the engine components 5 in an elastically displaceable manner. In this way, it is ensured that the mixer 20 can be sufficiently radially displaced during operation of the turbofan engine T with respect to the two engine components 5 and 6 so as to compensate thermal expansions of different degrees. Thus, the casing component 5 is exposed to considerably lower operating temperatures during operation of the turbofan engine T than the support component 6, past which the hot fluid flow from the low-pressure turbine is directly guided, or than the mixer 20, which is also passed at its inner side by the hot fluid from the primary flow channel, where the latter is also deflected.

As can be seen from the top view of FIG. 1B, recesses at outer edges of the connecting leg 300 and 301 that are facing away from each other are provided at the connecting ring 3 in the area of the base of each connection lug 30. In this way, tensions in the material of the connecting ring 3 that occur in the area of the respective base can be reduced. At the same time, recesses 32a and 32b, which are respectively designed in a substantially circular manner here, are kept comparatively small in order to limit the amount of fluid from the primary flow channel flowing through the connecting ring 3 at these locations.

Figure 2A:
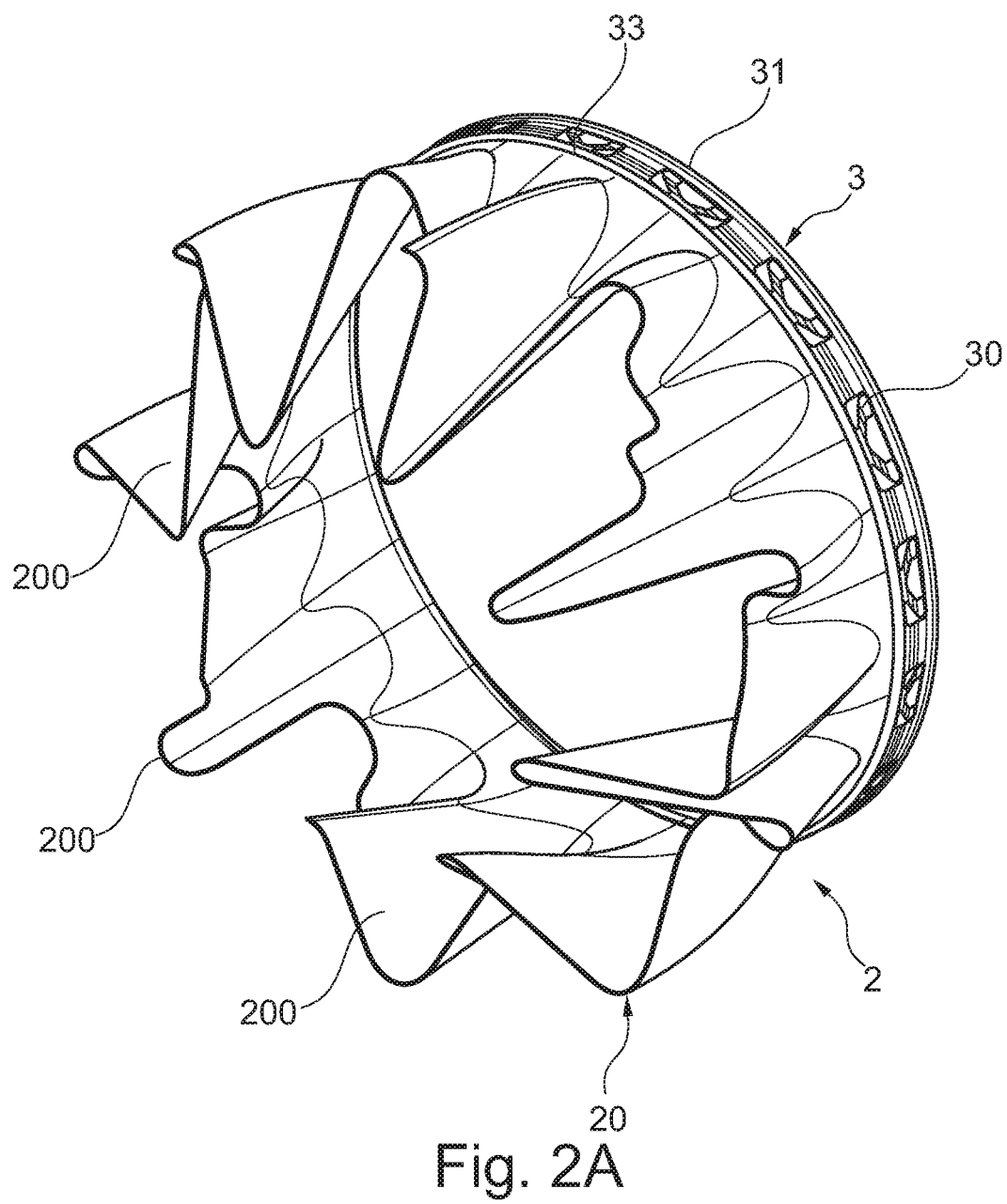
Figure 3A:
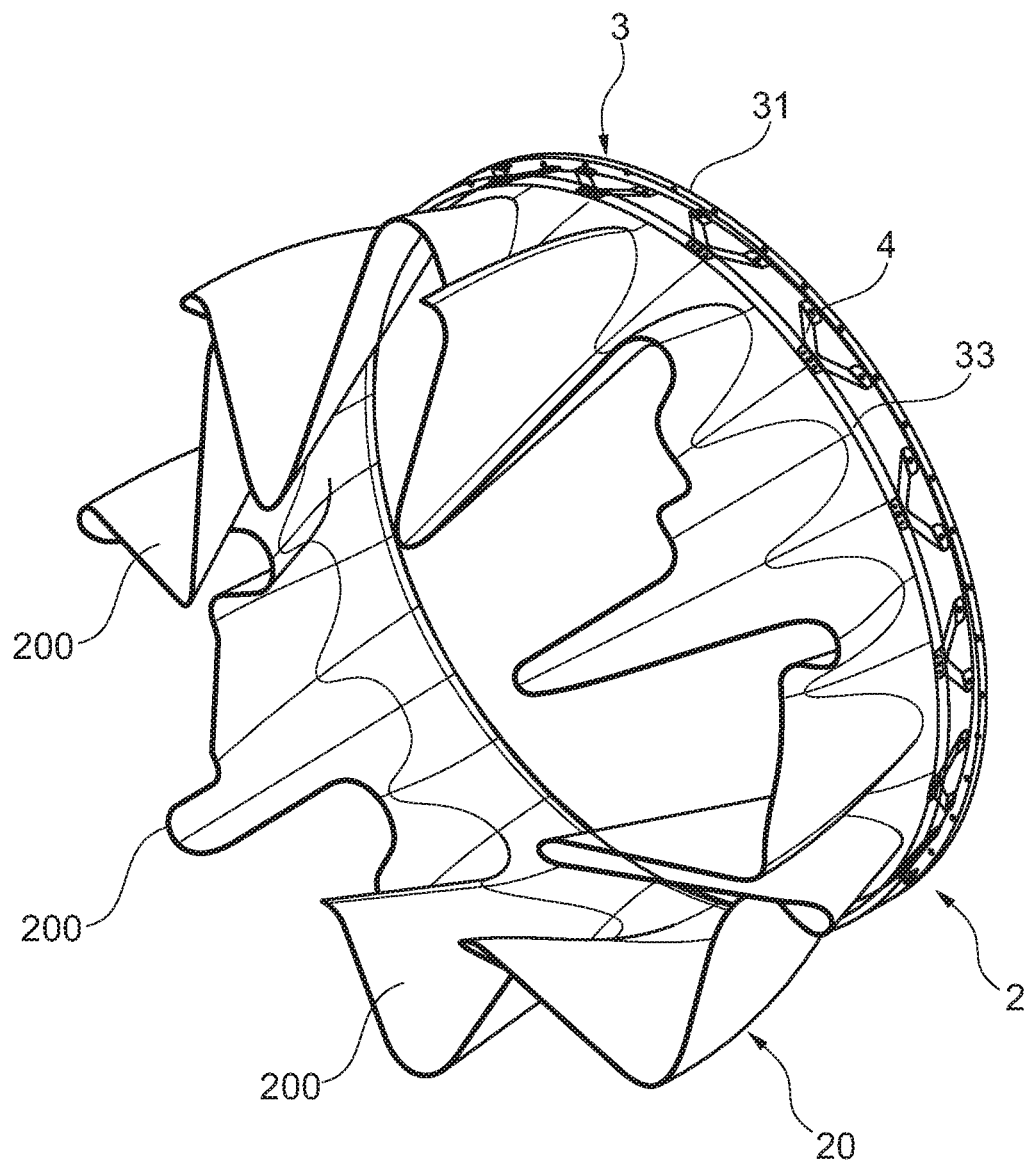
FIGS. 3A-3C show, in different views, a further embodiment variant of a mixer assembly group according to the invention, in which a connection appliance has multiple separate V-shaped second connection components in addition to a first connection component that takes the form of a connecting ring.
Figure 3B:
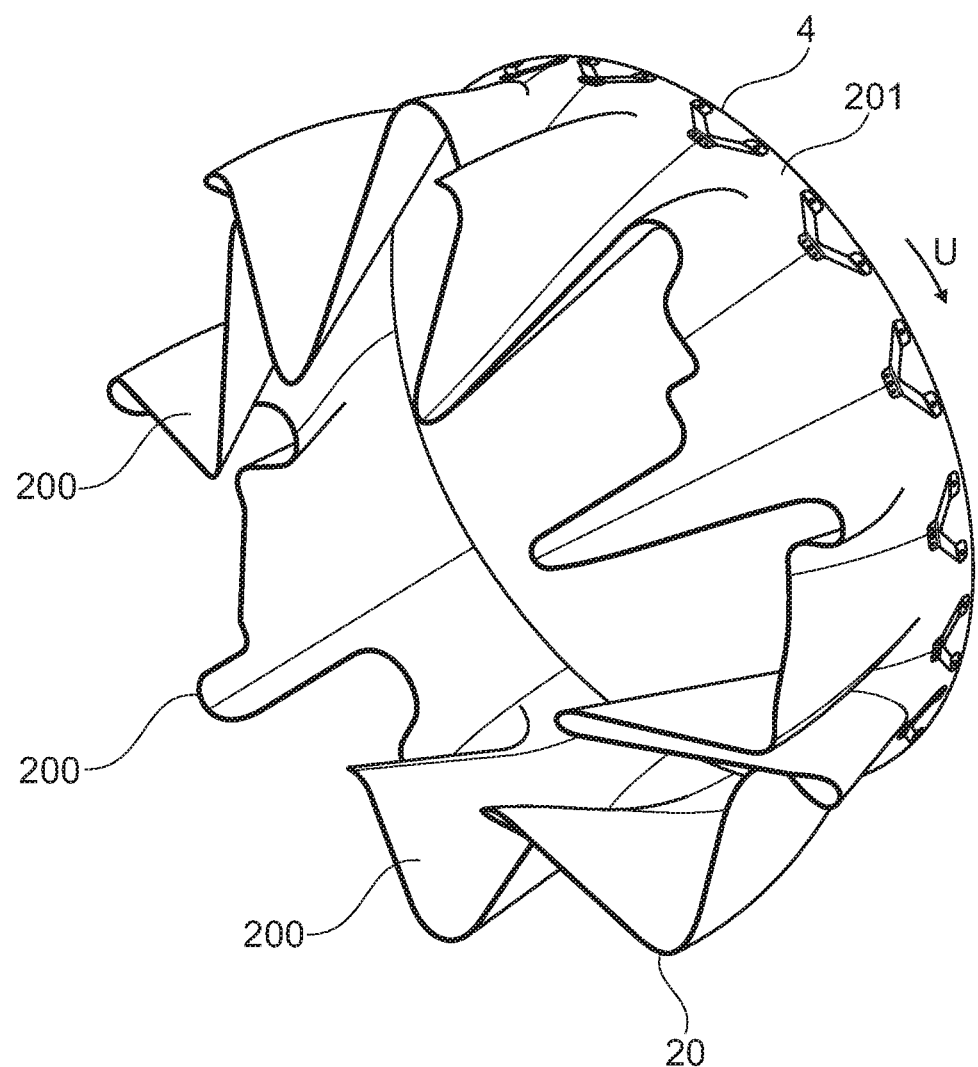
Figure 3C:
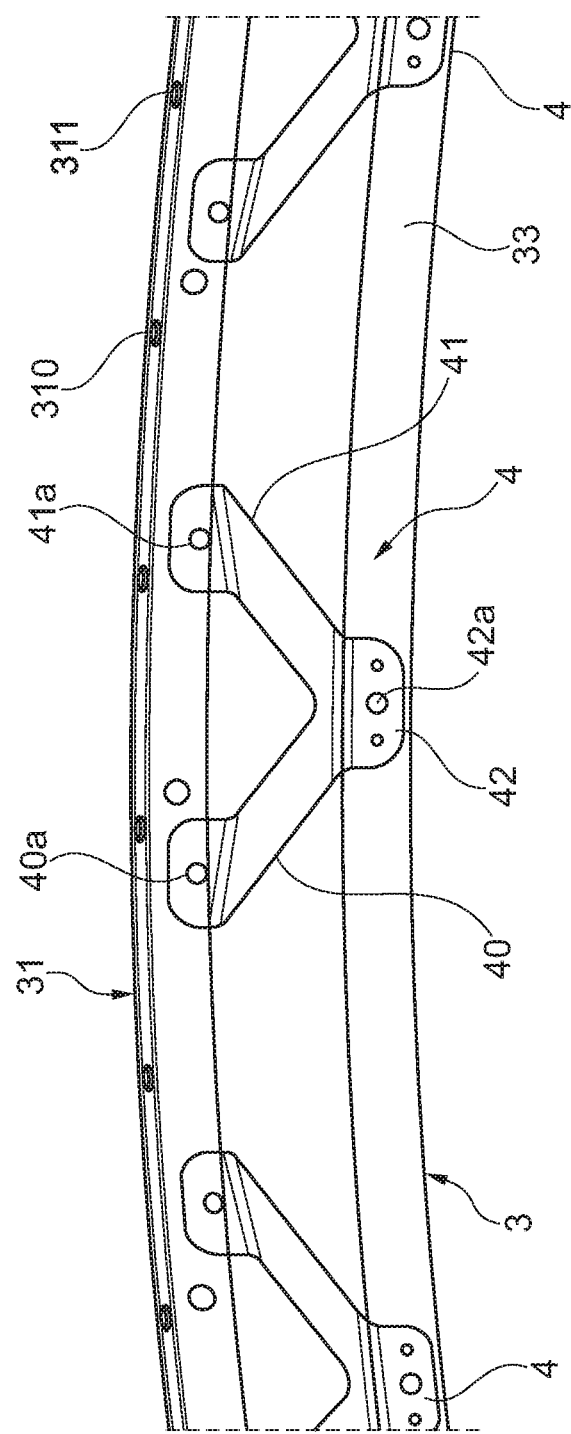
Figure 4A:
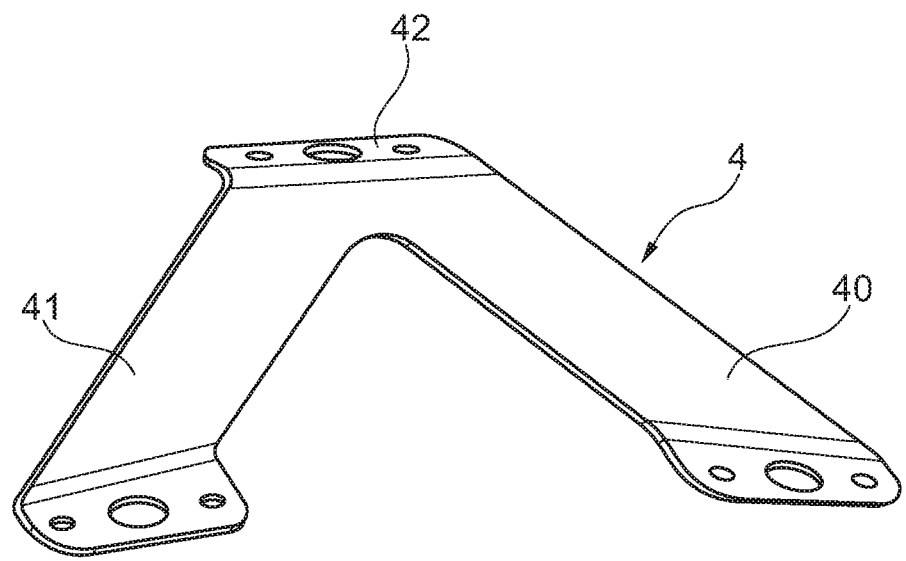
FIGS. 4A-4B show different views of a second connection component.
Figure 4B:
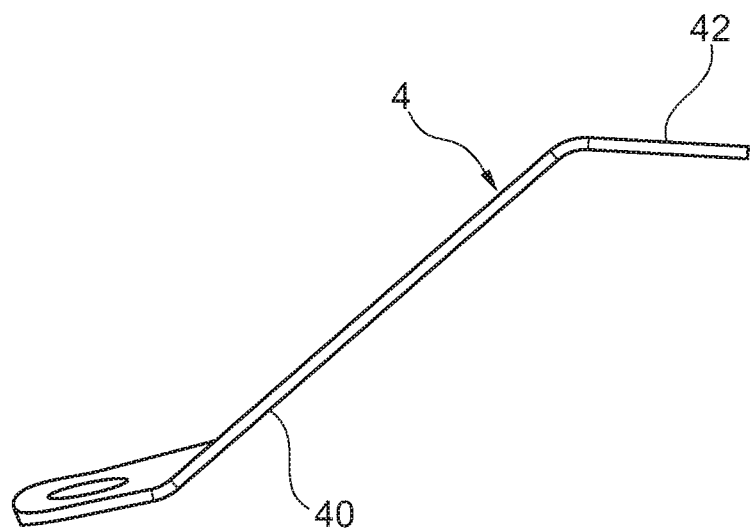
Figure 5:
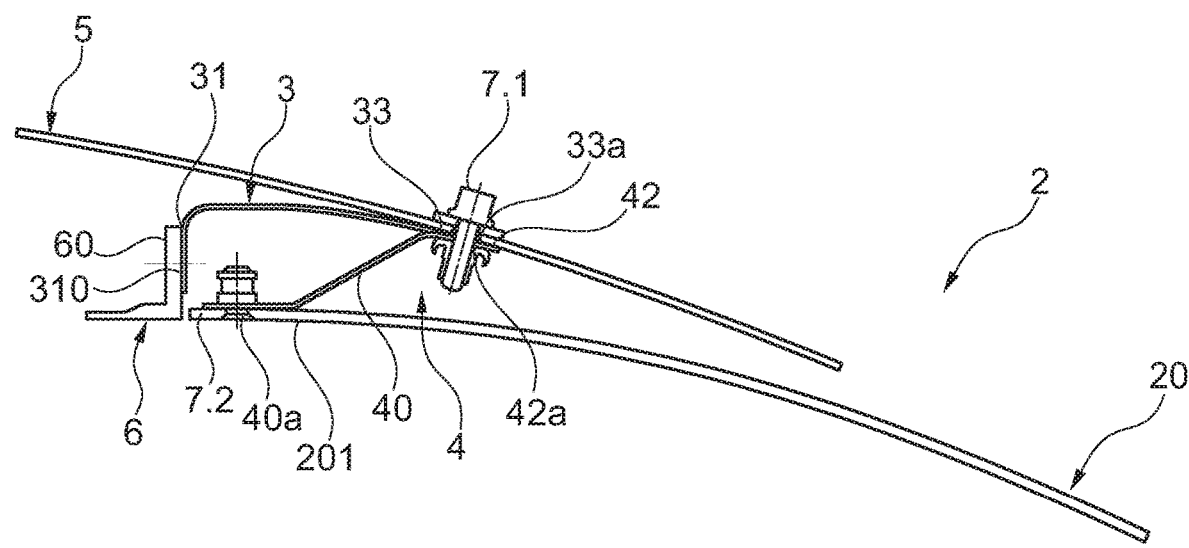
FIG. 5 shows, in sections, a cross-sectional rendering of the mixer assembly group of FIG. 3A that is mounted at engine components of the turbofan engine.

In contrast, in the exemplary embodiment of FIGS. 2A to 2C, a stronger flow through the connecting ring 3 is permitted in the area of the fastening clips 30 in favor of a greater reduction of the occurring tensions in the area of the fastening clips 30. In this embodiment variant, not only the lateral recesses 32a and 32b at the lateral edges of the connecting leg 300 and 301 facing away from each other are enlarged. Rather, also a recess 32c between the two connecting legs 300 and 301 is provided in the material of the connecting ring 3. In this manner, a higher elasticity is achieved in the area of the fastening clips 30 with the same material thickness.

However, what remains substantially identical in this embodiment variant, is a comparatively great force transmission [path] between the first attachment locations 300a and 301a, at which a fixation at the mixer 20 is respectively realized, and flange-side third attachment locations 310 and 311 for fixation at the hot support component 6, as it is provided via the connecting ring 3 with its integrally formed fastening clips 30. The corresponding force transmission paths are illustrated by way of example in the enlarged rendering of FIG. 2C. With the free ends of the connecting legs 300, 301 of each individual fastening clip 30 extending in the direction of the mounting flange 31 at the front edge of the connecting ring 3 at which the fixation at the support component 6 is realized, the axial distance between the first attachment locations 300a and 301a for the fixation at the mixer 20 to the third attachment locations 310, 311 is comparatively small. This results in a relatively short effective lever length and thus in a small radial displacement due to the occurring temperature gradients as compared to a fixation of the connecting ring 3 at the mixer 20 at a connection area that is a located further downstream in the direction of the exhaust A.

In addition to a first connection part in the form of a connecting ring 3, in the embodiment variants of the attached FIGS. 3A to 10, a connection appliance of the mixer assembly group 2 for connecting at the two engine components 5 and 6 of the turbofan engine T has multiple second connection components in the from of individual fastening brackets respectively having a V-shaped contour. The individual fastening brackets 4, which may for example be made of metal, are arranged at a connection area 201 of the mixer in a manner distributed about its outer circumference.

In the shown exemplary embodiments of FIGS. 3A to 10, the individual fastening brackets 4 are respectively arranged equidistantly to one another and are respectively fixated at least at one first attachment location 40a, 41a or 42a at the outer shell surface of the mixer 20. By using different separately manufactured connection components 3, 4, the connecting ring 3 can be formed without additional recesses and apertures for additional fixation at the mixer 20. The connecting ring 3, which is fixated at the casing component 5 as well as at the support component 6, can thus seal an intermediate space which is present between the two engine components 5 and 6 against the primary flow channel, when the mixer assembly group 2 is fixated according to the intended use at the two engine components 5 and 6. While in the variants of FIGS. 1A to 10 and 2A to 2C a leakage flow into such an intermediate space through the connecting ring 3 is tolerated, in the embodiment variants of FIGS. 3A to 10 it is to be excluded as much as possible. At most, leakage flows from the primary flow channel into an intermediate space between the inner side of the casing component 5 and the outer shell surface of the mixer 20 are to be facilitated. At the same time, a temperature-related radial displaceability of the mixer 20 is still to be provided through the plurality of V-shaped fastening brackets 4 and the axial distance of the individual attachment locations.

Through the V-shape, a fastening bracket 4 can be respectively formed with comparatively thin-walls (c.f. for example FIGS. 4B, 5, 6C, 7C, 9A-9B and 10) [and] has a very small local area moment of inertia. Each individual fastening bracket 4 can thus be bent in a comparatively simple manner, i.e. by applying a comparatively small force. This (local) bending property is advantageous with respect to the differing temperatures that are present in different sections of the fastening bracket 4. But at the same time, a framing system axially holding the mixer 20 in a very stable manner and allowing for the compensation [of] resulting forces, as they may occur as a result of vibrations and inertial forces, in the axial direction and in the circumferential direction is provided through the arrangement of multiple V-shaped fastening brackets 4 in a manner distributed about the circumference of the mixer 20.

A first embodiment variant with a connecting ring 3 and multiple fastening brackets 4 that are separate of the same is shown FIGS. 3A-30, 4A-4B and 5. The connecting ring 3, which in the present case has a substantially L-shaped cross section, is fixated with its mounting flange, which is provided at the front edge of the connecting ring 3, at the connecting flange 60 of the support component 6 at third attachment locations 310, when the mixer assembly group 2 has been mounted according to the intended use. Downstream, the connecting ring 3 is fixated at its rear edge at the inner side of the casing component 5, forming multiple second attachment locations 33a. Fastening brackets 4 are arranged in a manner circumferentially offset with respect to one another in an intermediate space formed between the connecting ring 3 and the outer shell surface of the mixer 20. Here, each fastening bracket 4 is connected to the connecting ring 3 and the casing component 5 through the same attachment element 7.1 by means of which the connecting ring 3 is connected at its second attachment location 33a to the casing component 5. Here, the connection of the respective V-shaped fastening bracket 4 via an attachment element 7.1 is realized at an attachment section 42 of the attachment lobe 4. At the same time, this attachment section 42 forms a base for two connecting legs 40 and 41 of the attachment lobe 4 that extend away from the same at an angle and that are fixated at the mixer 20 at their front ends via respectively one attachment element 7.2.

Thus, at each fastening bracket 4, an attachment location 42a is provided at an attachment section 42 for connecting to the connecting ring 3 and the casing component 5. Further, the two connecting legs 40, 41 of a [fastening bracket] 4 define first attachment locations 40a and 41a which are arranged at a distance to one another along a circumferential direction U and at which the respective fastening brackets 4 are fixated at the mixer 20. At that, each of the connecting legs 40, 41 of a fastening bracket 4 extends from the attachment location 42a for the connection to the connecting ring 3 and the casing component 5 counter to the flow direction of the fluid flows f1, f2 and away from the exhaust A in the direction of a frontal face side of the mixer 20 that is facing towards the support component 6. Here, each of the connecting legs 40, 41 bridges—in the direction of the respective attachment location 40a or 40b at which the respective connecting leg 40, 41 is fixated at the mixer 20—a radial distance between the inner side of the end section of the casing component 5 that protrudes beyond the connection area 201 of the mixer 20 and the connection area 201 at a front end of the outer shell surface of the mixer 20. In a cross-sectional view generated in parallel to the central axis e (e.g. according to FIG. 5), each leg 40, 41 of a fastening bracket 4 thus extends obliquely from a second attachment location 42a for the connecting ring 3 and the casing component 5 to a first attachment location 40a or 41a for the mixer, which is located in the direction of the support component 6. Through the thus designed and fixated fastening brackets 4 with their connecting legs 40, 41, an elasticity is introduced into the shown mixer system of the turbofan engine T through which the mixer 20 can be radially displaced relative to the engine components 5 and 6 in the event of a temperature-related thermal expansion, while at the same time being held at the engine components 5 and 6 in a rigid manner in the axial direction.

Through the extension of the connecting leg 40, 41, starting from the attachment section 42 in the direction of the support component 6, the first attachment locations 40a and 41a, at which a respective fastening bracket 4 is fixated at the mixer 20, are arranged not only in an axially offset manner with respect to the second and third attachment locations 33a and 310, at which the connecting ring 3 is fixated to the two engine components 5 and 6. Rather, the first attachment locations 40a and 41a are also arranged between the second and third attachment locations 33a and 310 in the axial direction. In this way, the connecting ring 3 can almost completely cover the retaining brackets 4 that are arranged next to each other along the circumference, and the entire connection device 3, 4 has a very compact construction.

Figure 6C:
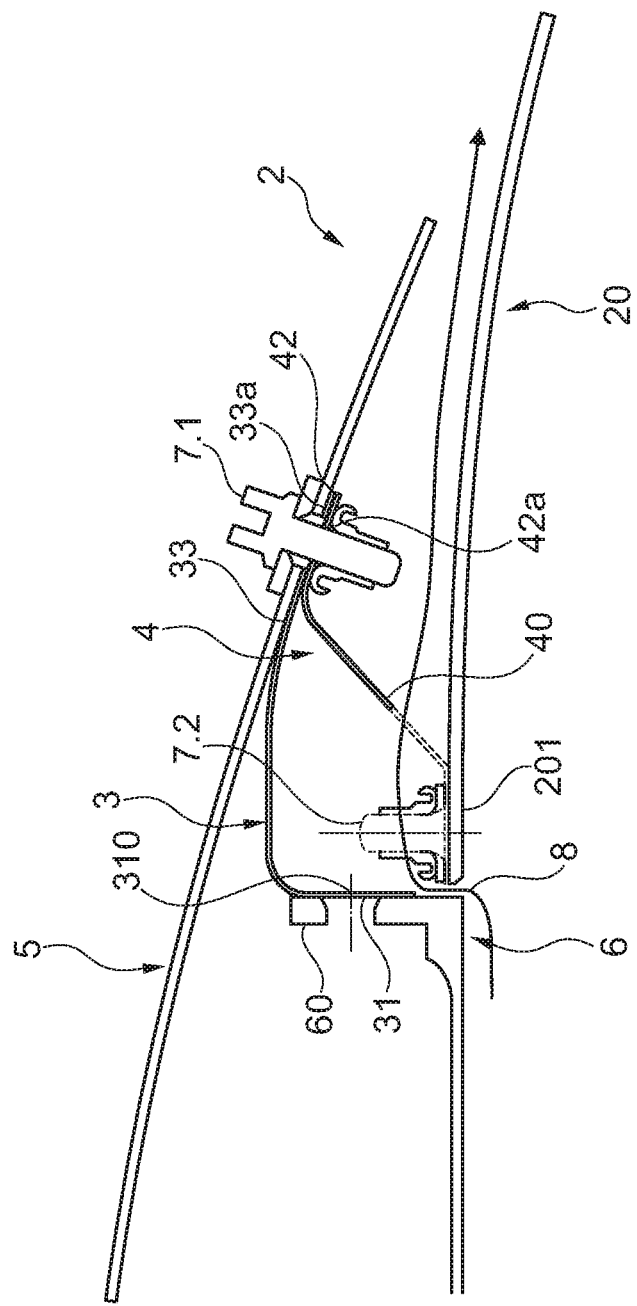
FIG. 6C shows, in sections, a cross-sectional rendering of the mixer assembly group of FIG. 6A that is mounted at the engine component.

In the embodiment variant of FIGS. 6A to 6C, a structure of a connection appliance formed by the connecting ring 3 and multiple fastening brackets 4 that largely corresponds to the embodiment variant of FIGS. 3A to 5 is chosen for the connection of the mixer assembly group 2. In particular, a fixation of the connecting ring 3 at the connecting flange 60 of the support component 6 by means of its mounting flange 31 is embodied in a corresponding manner. In FIG. 6B, only the fixation via attachment elements in the form of threaded bolts is illustrated more closely by way of example.

Further, it is provided in the embodiment variant of FIGS. 6A to 6C that, after the mixer assembly group 2 has been mounted at the two engine components 5 and 6 according to the intended use, an axial minimum distance is provided between the mixer 20 and the support component 6 through the connection appliance 3, 4, so that an annular gap 8 is formed between the mixer 20 [and] the support component 6. Through this annular gap 8, a spatial separation of components that are subjected to different thermal loads, here the support component 6 and the mixer 20, is predetermined to a defined extent. In this manner, the support component 6 and the mixer 20 are also axially decoupled from each other, whereby improved dynamic damping properties of the mixer 20 are achieved. Further, a targeted leakage flow from the primary flow channel into the intermediate space that is formed between the casing component 5 and the outer shell surface of the mixer 20 can be allowed through the annular gap 8. This may be advantageous for an intermixing of the two fluid flows from the primary flow channel of the core engine and the bypass channel B. Further, the leakage flow that is permitted to occur in a targeted manner can lead to an improved, and therefore additionally supporting ('re-energized'), flow of the (cold) second fluid flow f2 of the bypass channel B in the area of the mixer assembly group 2, in particular in the area of the casing component 5. Here, the annular gap 8 that is set via the connection appliance 3, 4 has a width of maximally approximately 2 mm, for example.

In the embodiment variant of FIGS. 7A to 7D, a corresponding annular gap 8 is also provided between the mounted mixer 20 and the support component 6. Here, the specification of the desired minimum distance is supported through the arrangement of a distance piece in the form of a spacer ring 9. This spacer ring 9, which extends about the central axis M, is arranged between the connecting flange 60 of the support component 6 and the mounting flange 31 of the connecting ring 3 in order to ensure that the result of a fixation of the mixer assembly group 2 in particular at the support component 6 is an annular gap 8 with the desired minimum width between the support component 6 and the mixer 20.

Figure 7A:
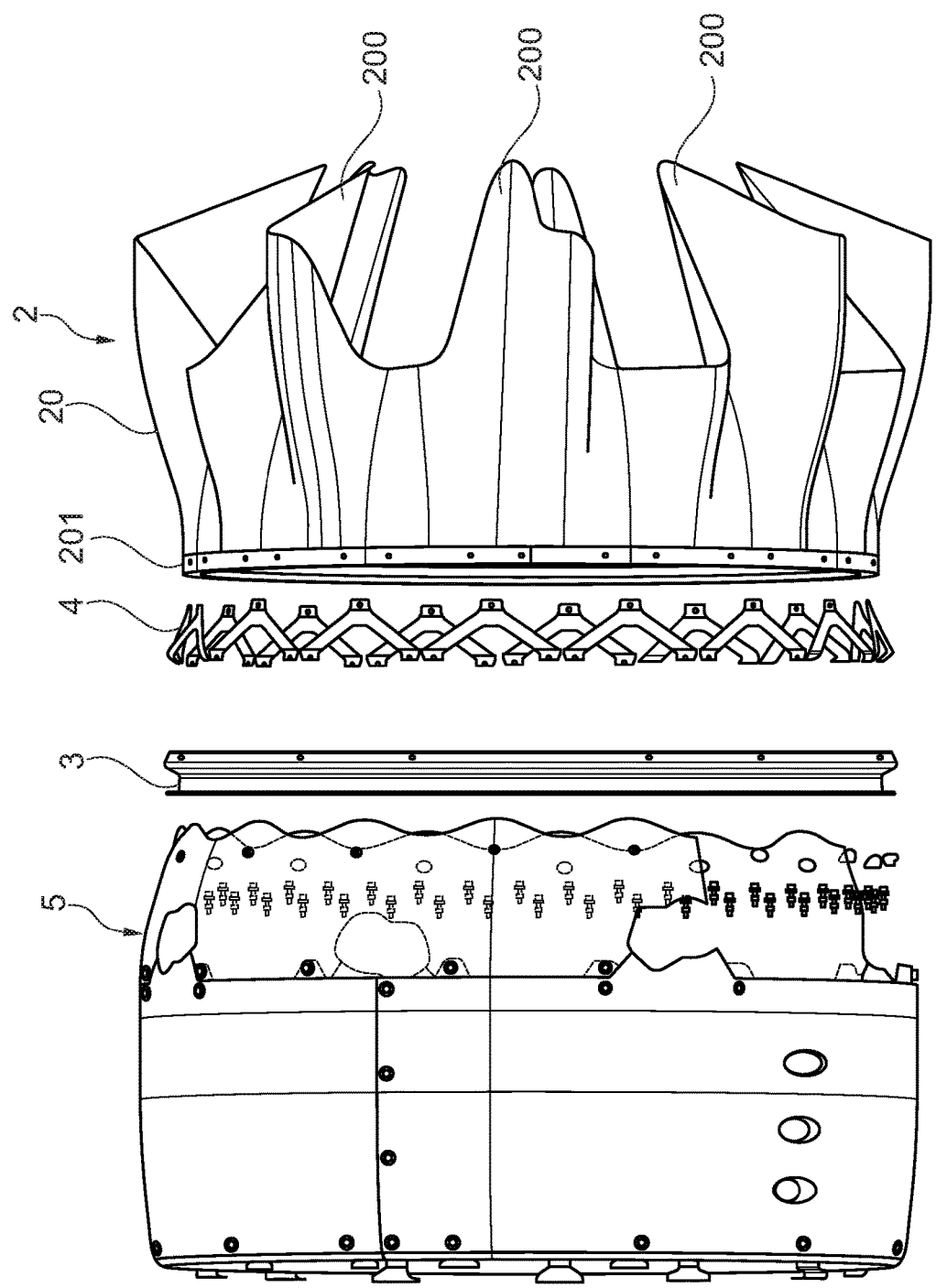
FIG. 7A shows an exploded view of a further embodiment variant of a mixer assembly group according to the invention together with a first engine component at which the mixer assembly group is fixated.
Figure 7B:
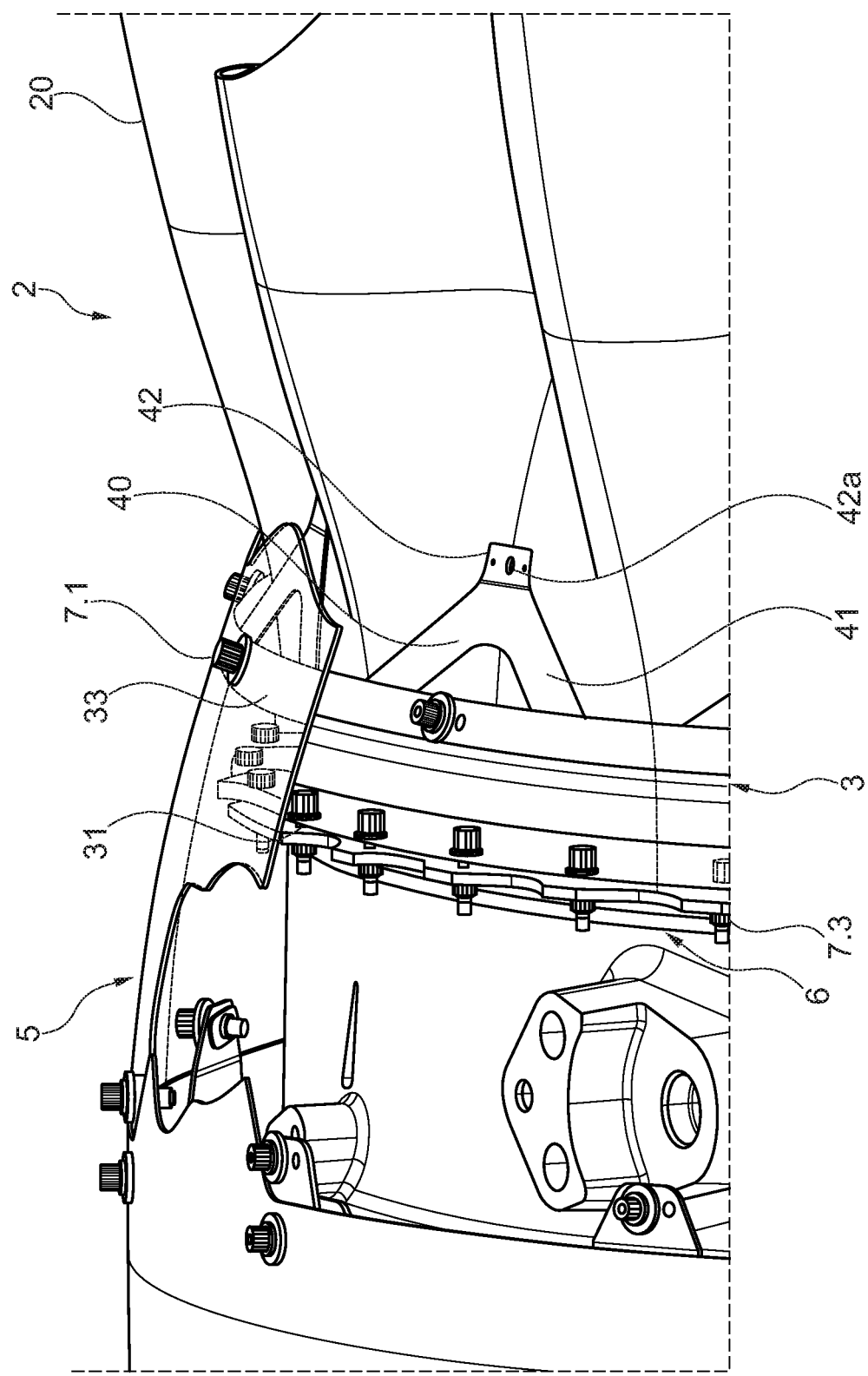
FIG. 7B shows, in sections, the mixer assembly group of FIG. 7A that is mounted at two engine components.
Figure 7C:
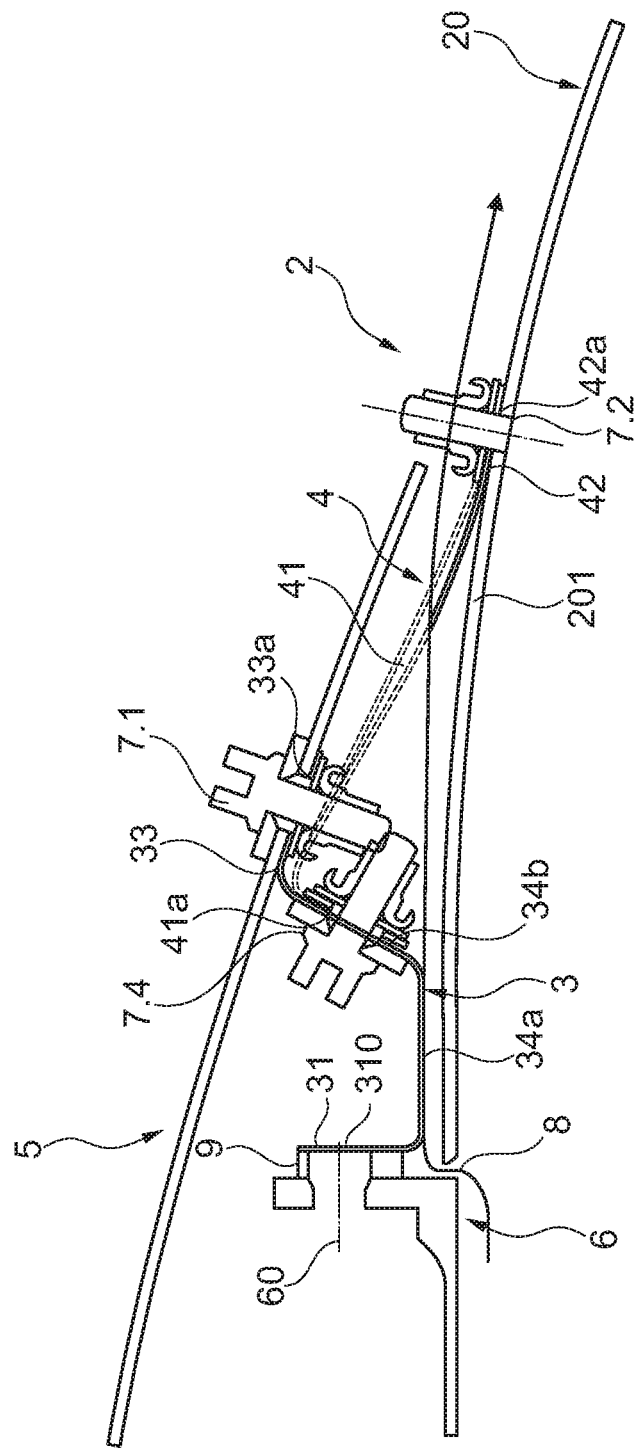
FIG. 7C shows, in sections, a cross-sectional rendering of the mixer assembly group of FIG. 7A that is mounted at the engine components.
Figure 7D:
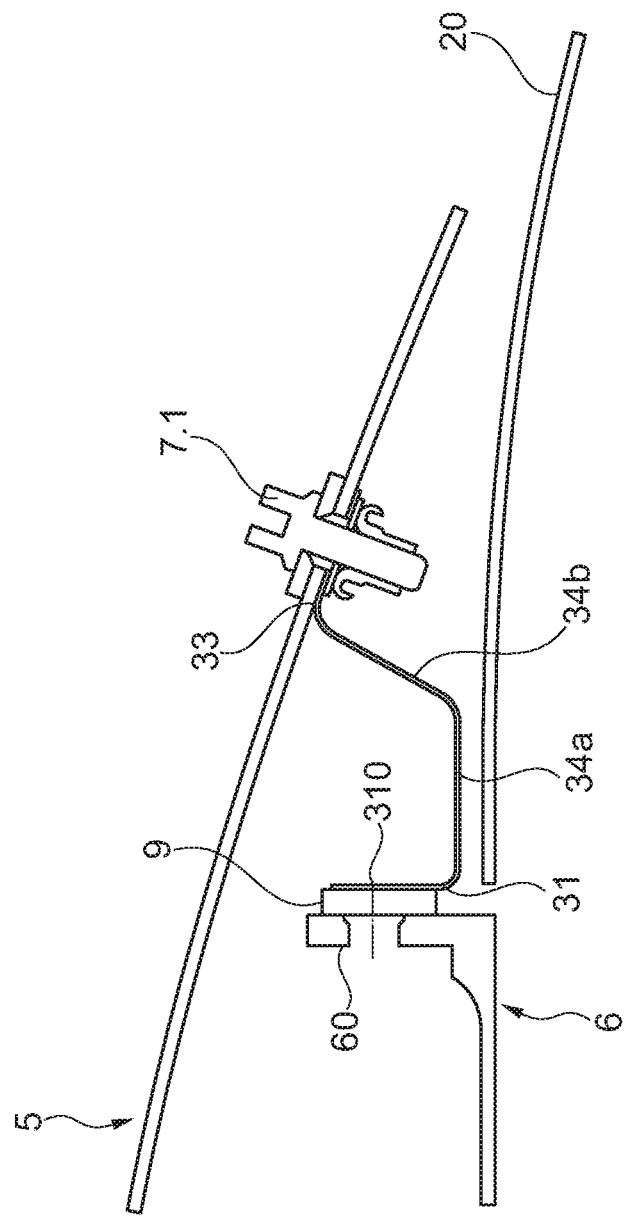
FIG. 7D shows an additional cross-sectional view of the embodiment variant of FIGS. 7A to 7C, with the second connection component that is fixated at the mixer being omitted.
Figure 8B:
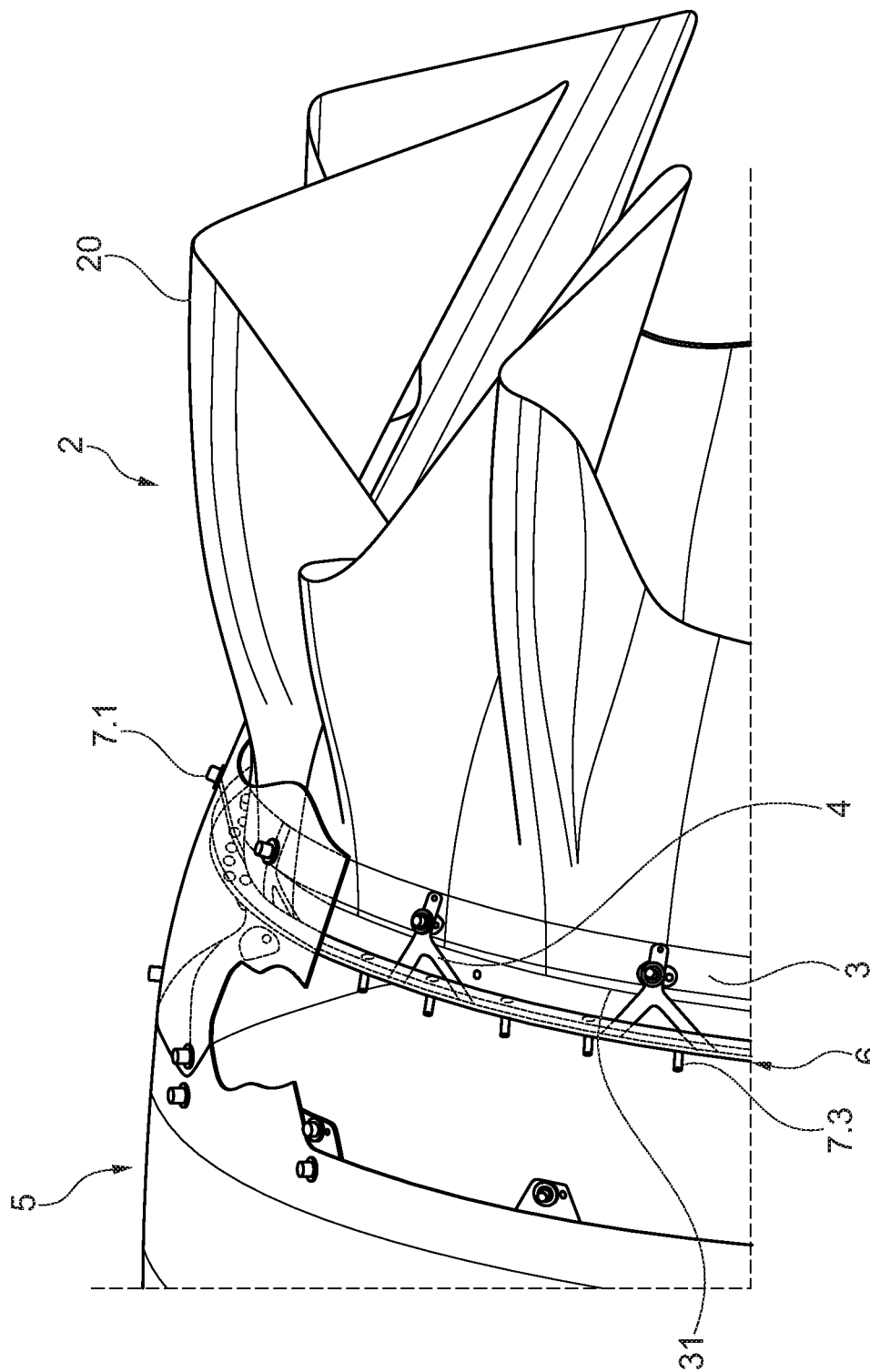
FIG. 8B shows, in sections, the mixer assembly group of FIG. 8A that is mounted at two engine components.

Further, in the embodiment variant of FIGS. 7A to 7C, the connecting ring 3 is provided with a stepped middle area. Thus, in the cross section, the connecting ring first transitions from the mounting flange 31 at its front edge into a first middle section 34a that extends at an angle of approximately 90° to the mounting flange 31 in the cross-sectional view of FIG. 7C. In its further axial extension, this first middle section 34a then transitions into a further, second middle section 34b which also extends at an angle—in the present case of more than 90°—to the first middle section 34a and from which the attachment section 33 that is provided at the rear edge of the connecting ring is angled away. The connecting ring 3 thus substantially forms the contours of a lying S in the cross section. Thanks to the design with a middle area that is stepped in the cross section, the connecting ring 3 has a greater axial rigidity.

The separate, V-shaped fastening brackets 4 that are also provided in this embodiment variant and that are arranged along the circumference of the mixer 20 and fixated at the same extend respectively downstream of the connecting ring 3. In the present case, each fastening bracket 4 is fixated via its two connecting legs 40 and 41 at respectively one attachment location 40a or 41a at the second middle section 34b of the connecting ring 3. Via the base that connects both connecting legs 40 and 41 and that serves as an attachment section 42, each fastening bracket 4 is further fixated at the outer shell surface of the mixer 20. Accordingly, here each fastening bracket 4 is not fixated at the casing component 5 directly through an attachment element 7.1, but rather at the connecting ring 3 through respectively two additional attachment elements 7.4, which may for example also be present in the form of a threaded bolt, respectively. The first attachment locations 42a for the fixation of a fastening bracket 4 at the mixer 20 are thus defined by the attachment locations 42a at the base 42 of each fastening bracket 4, which are also arranged so as to be respectively axially offset in the direction of the exhaust A with respect to the second and third attachment locations 33a and 310 for the fixation of the connecting ring 3 at the two engine components 5 and 6. However, as for the axial direction, the second attachment locations 33a, at which a connection of the mixer assembly group 2 to the casing component 5 is realized, lie between the first attachment locations 42a and the third attachment locations 310 here.

What is chosen in the embodiment variant of FIGS. 8A-8B, 9A-9B and 10 is a combination of a connecting ring 3 and a plurality of V-shaped fastening brackets 4 that are distributed about the circumference in a manner substantially corresponding to the embodiment variant of FIGS. 6A to 6C, with each of the fastening brackets 4 being received partially or preferably completely in the intermediate space between the connecting ring 3 and the outer shell surface of the mixer 20.

Figure 9A:
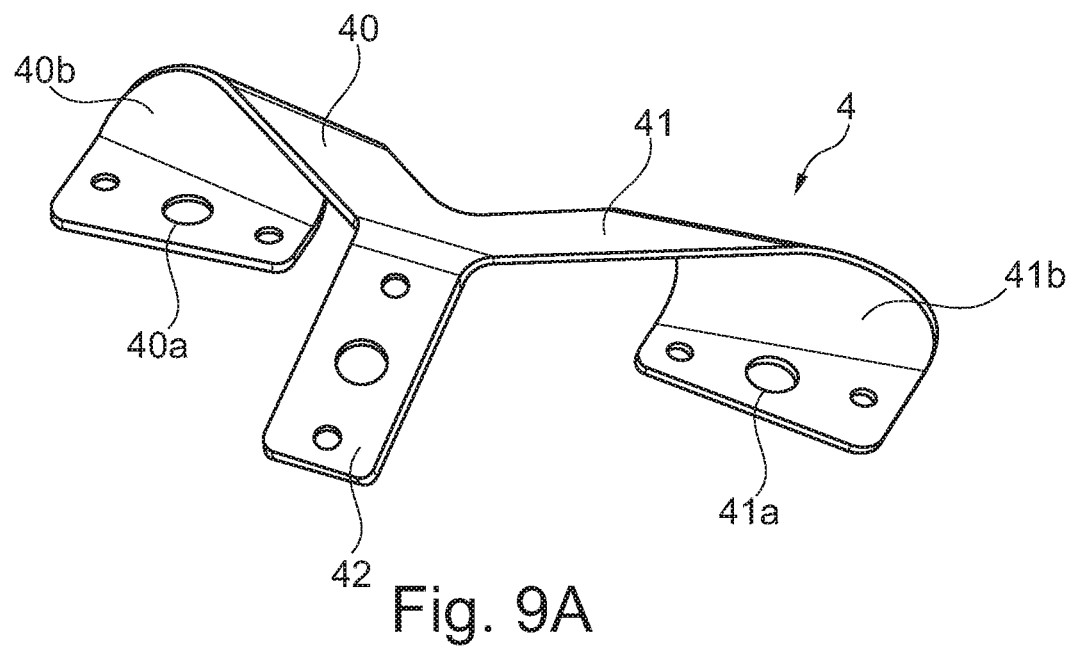
FIGS. 9A-9B show, in different views, a second connection component of the embodiment variant of FIGS. 8A and 8B, having a V-shaped contour and being bent at two connecting legs by respectively more than 90°, here more than 135°, in the direction of a first attachment location for fixation at the mixer.
Figure 9B:
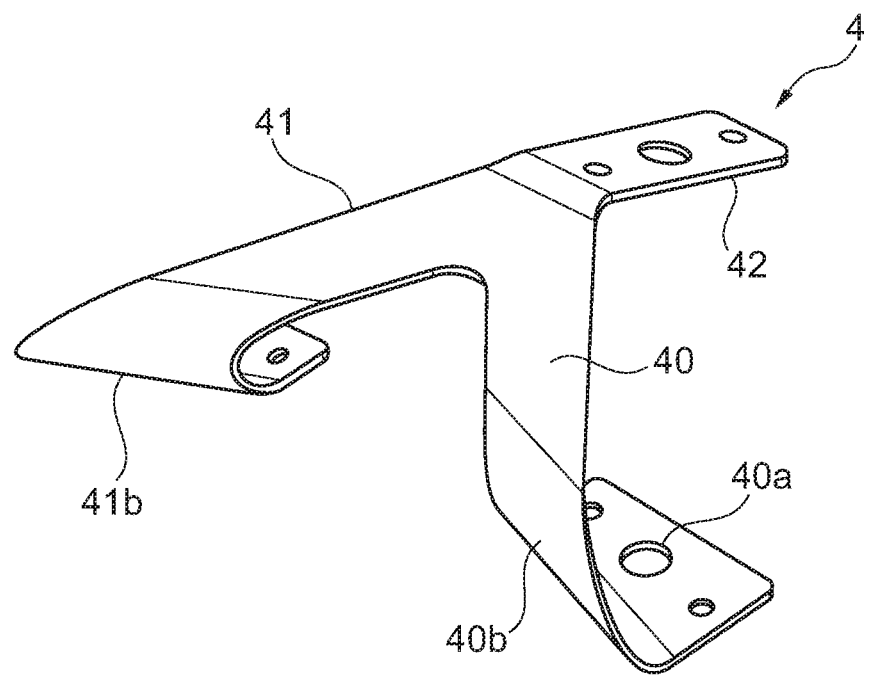
Figure 10:
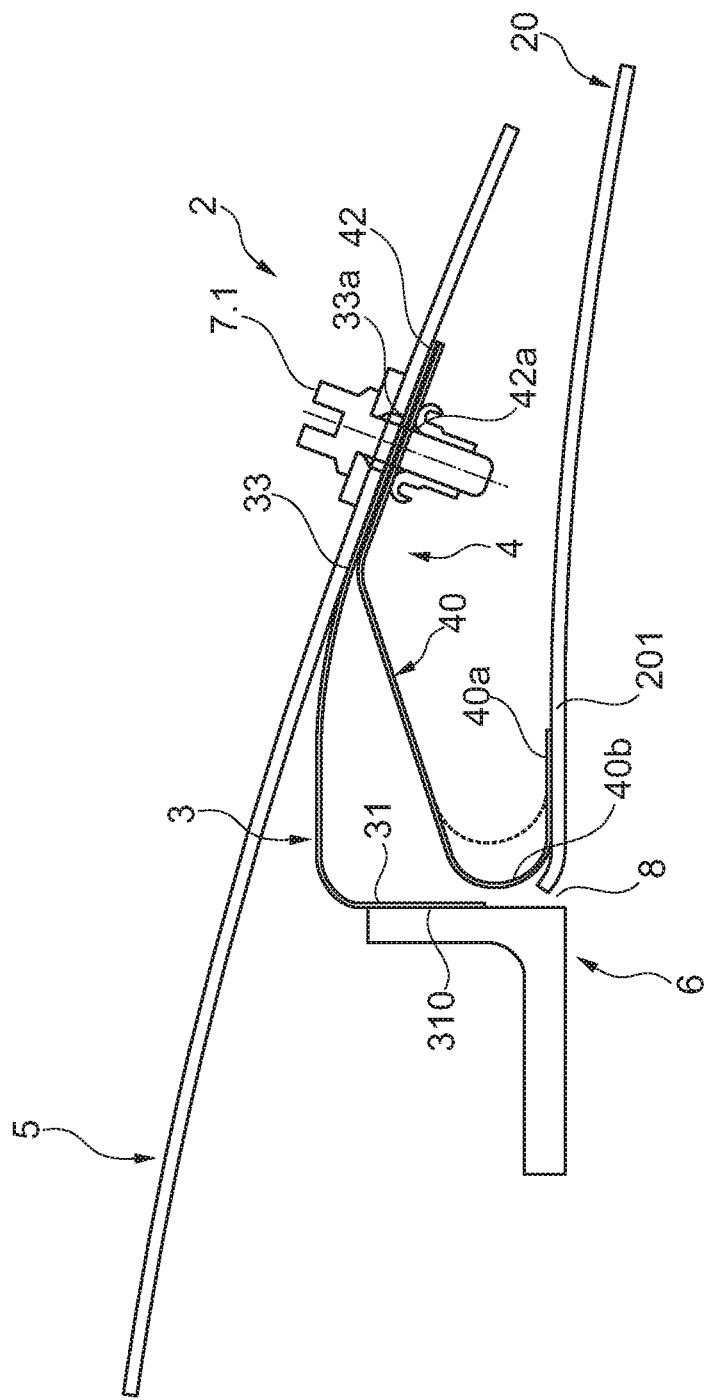
FIG. 10 shows, in sections, a cross-sectional rendering of the variant of FIGS. 8A to 8B with a mixer assembly group that is mounted at the engine components.

However, in contrast to the embodiment variant of FIGS. 6A to 6C, an axial distance between the second attachment locations 33a for the fixation at the casing component 5 and the third attachment locations 310 for the fixation of the support component 6 is increased. Further, each of the connecting legs 40 and 41 of a fastening bracket 4 is provided with a curvature 40b, 41b of more than 120° as it extends from the associated attachment section 42, which is fixated at the casing component 5 and the attachment section 33 of the connecting ring 3, to its end that defines the respective attachment location 40a, 41a. An end section of each connecting leg 40 or 41, which is fixated at the mixer 20, thus has a convex curvature that points in the direction of the support component 6. In the embodiment variant of FIGS. 8A to 10, for which a single fastening bracket 4 is shown in FIGS. 9A and 9B in different perspective views, a curvature of for example approximately 150° is provided at each connecting leg 40 or 41 to obtain a maximally compact connection appliance 3, 4 for the fixation of the mixer assembly group 2 at the two engine components 5 and 6 with a good compromise between axial rigidity and radial flexibility. Here, the respective curvature 40b, 41b may for example be created by correspondingly bending the respective connecting leg 40, 41. In the embodiment shown in FIG. 12, the base 42 is attached to the mixer 20 the first leg 40 is attached to the engine component 5 and the second leg is attached to the connecting ring 3, which is attached to the engine component 6.

Of course, instead of providing a single continuous connecting ring 3, it is also possible—in contrast to the exemplary embodiments of FIGS. 1A to 10 described above—to provide multiple connection components shaped as ring segments, at which preferably lug-like and V-shaped attachment sections are integrally formed or which are combined with multiple V-shaped second connection components 4 in order to fixate the mixer 20 of the mixer assembly group 2 at the two engine components 5 and 6, which are subject to comparatively strongly differing operating temperatures during operation of the turbofan engine T, with the desired radial flexibility.

PARTS LIST

11 low-pressure compressor
12 high-pressure compressor
13 high-pressure turbine
14 medium-pressure turbine
15 low-pressure turbine
2 mixer assembly group
20 mixer
200 guide element
201 connection area
21 interface
3 connecting ring (connection component)
30 fastening clip (attachment section for the mixer)
300, 301 connecting leg
300a, 301a attachment location
31 mounting flange (attachment section for the connecting flange)
310, 311 flange-side attachment location
32a, 32b, 32c recess
33 base/attachment section (for the casing component)
33a attachment location
34a, 34b middle section
4 fastening bracket (additional connection component)
40, 41 connecting leg
40a, 41a attachment location
40b, 41b curvature
42 base/attachment section (for the casing component or mixer)
42a attachment location
5 casing component
6 support component
60 connecting flange
7.1-7.4 attachment element
8 annular gap
9 spacer ring (distance piece)
A exhaust
B bypass channel
BK combustion chamber section
C outlet cone
E inlet/intake
F fan
f1, f2 fluid flow
FC fan housing
L guide vane assembly group
M central axis/rotational axis
R entry direction
S rotor shaft
T turbofan engine
TT turbine
U circumferential direction
V compressor

The invention claimed is:
1. A mixer assembly group for a turbofan engine comprising:
a primary flow channel extending along a central axis of the turbofan engine;
a secondary flow channel;
a first engine component;
a second engine component with a different operation temperature than the first engine component during operation of the turbofan engine; and
a mixer for guiding a first fluid flow from the primary flow channel and a second fluid flow from the secondary flow channel in a direction of an exhaust of the turbofan engine, as well as for intermixing the first fluid flow and the second fluid flow;
a connection appliance by which the mixer is connected to the first engine component and the second engine component, wherein the connection appliance includes:

a V-shaped connector with a first leg, a second leg, and a base that connects the first leg and the second leg, wherein the base is attached to the mixer at a first attachment location and wherein the first leg is attached to the first engine component at a second attachment location for attaching the mixer to the first engine component;

a second connector, wherein the second leg of the V-shaped connector is attached only to the second connector with respect to the first engine component, the second engine component, and the second connector; and wherein the second connector is attached at a third attachment location for attaching the mixer to the second engine component;

wherein the first attachment location, the second attachment location and the third attachment location are axially offset with respect to one another regarding the central axis of the turbofan engine;

wherein the mixer is supported in a radially displaceable manner relative to the first engine component as well as relative to the second engine component with respect to the central axis of the turbofan engine via the V-shaped connector when the mixer is attached to the first engine component at the second attachment location and to the second engine component at the third attachment location;

wherein the first leg is attached only to the first engine component with respect to the first engine component, the second engine component, and the second connector at the second attachment location; and wherein the second connector is shaped as a ring.

2. The mixer assembly group according to claim 1, wherein, via the V-shaped connector, the mixer is elastically supported in the radially displaceable manner with respect to the central axis of the turbofan engine.

3. The mixer assembly group according to claim 1, wherein the first attachment location is radially offset with respect to at least one chosen from the second attachment location and the third attachment location with respect to the central axis.

4. The mixer assembly group according to claim 1, wherein the mixer includes at least one chosen from:
   a blossom-shaped or meander-shaped contour; and guide elements of different axial lengths for guiding the first fluid flow and the second fluid flow.

5. The mixer assembly group according to claim 1, wherein the mixer is at least partially manufactured from a fiber reinforced composite.

6. The mixer assembly group according to claim 5, wherein the mixer is manufactured from a ceramic matrix composite.

7. The mixer assembly group according to claim 1, wherein the second connector extends across the V-shaped connector which is attached to the mixer at the first attachment location.

8. The mixer assembly group according to claim 1, wherein an axial minimum distance of the mixer to the second engine component is predetermined through the V-shaped connector and the second connector, so that a gap is defined between the mixer and the second engine component.

9. The mixer assembly group according to claim 8, wherein the gap is a ring-shaped gap.

10. The mixer assembly group according to claim 8, and further comprising at least one distance piece for connecting the mixer to the second engine component, to hold the mixer at the axial minimum distance to the second engine component.

* * * * *